(12) United States Patent
Mengnan et al.

(10) Patent No.: US 12,289,146 B2
(45) Date of Patent: Apr. 29, 2025

(54) OAM NON-COAXIAL ESTIMATION AND COMPENSATION

(71) Applicant: ZTE Corporation, Shenzhen (CN)

(72) Inventors: Jian Mengnan, Shenzhen (CN); Yijian Chen, Shenzhen (CN); Guanghui Yu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 82 days.

(21) Appl. No.: 18/204,187

(22) Filed: May 31, 2023

(65) Prior Publication Data

US 2023/0421214 A1 Dec. 28, 2023

Related U.S. Application Data

(63) Continuation of application No. PCT/CN2021/074272, filed on Jan. 29, 2021.

(51) Int. Cl.
*H04B 7/02* (2018.01)
*H04B 7/0456* (2017.01)
*H04L 25/02* (2006.01)

(52) U.S. Cl.
CPC ....... *H04B 7/0469* (2013.01); *H04L 25/0204* (2013.01)

(58) Field of Classification Search
CPC .............. H04B 7/0469; H04L 25/0204
USPC ............... 375/267, 262, 259, 219, 295, 316
See application file for complete search history.

(56) References Cited

U.S. PATENT DOCUMENTS

| 10,411,811 B2 | 9/2019 | Willner et al. |
| 2020/0296599 A1 | 9/2020 | Sasaki et al. |
| 2023/0261722 A1* | 8/2023 | Xi .............................. H01Q 3/26 370/329 |
| 2023/0403095 A1* | 12/2023 | Huang .................. H04L 5/0048 |

FOREIGN PATENT DOCUMENTS

KR 20180097437 8/2018

OTHER PUBLICATIONS

Chen, Rui et al., "Beam Steering for the Misalignment in UCA-Based OAM Communication Systems", IEEE Wireless Communications Letters, Aug. 31, 2018, pp. 1-4.
Chen, Rui et al., "Effect of Beam Steering on the Performance of Misaligned Multi-Mode OAM Communications", 2019 IEEE 90th Vehicular Technology Conference, Nov. 7, 2019, pp. 1-4.
Xu, Hui, "Research on vortex electromagnetic wave transmission technology based on uniform circular array", Chinese Doctoral Master's Theses Full-Text Database, Feb. 15, 2020, sections 3-4, includes English abstract of pp. 7-8 (77 pages).

(Continued)

*Primary Examiner* — Zewdu A Kassa
(74) *Attorney, Agent, or Firm* — Crowell & Moring LLP

(57) ABSTRACT

This document generally relates to use of non-coaxial estimation and compensation for orbital angular momentum (OAM) communication. The transmitting node may transmit an OAM signal to a receiving node. A non-coaxial parameter estimation node may determine one or more non-coaxial parameters according to the OAM signal. The transmitting node and/or the receiving node may perform beam forming and/or channel compensation based on the non-coaxial parameters.

19 Claims, 3 Drawing Sheets

(56) References Cited

OTHER PUBLICATIONS

Internationa Search Report and Written Opinion for International applicaton No. PCT/CN2021/074272 mailed Oct. 26, 2021 (6 pages).
Alan E. Willner et al., "Recent advances in high-capacity free-space optical and radio-frequency communications using orbital angular momentum multiplexing", Oct. 13, 2016; https://royalsocietypublishing.org/doi/10.1098/rsta.2015.0439 (18 pages).

* cited by examiner

OAM NON-COAXIAL ESTIMATION AND COMPENSATION

CROSS-REFERENCE TO RELATED APPLICATIONS

This application is a continuation of International Patent Application No. PCT/CN2021/074272, filed Jan. 29, 2021. The contents of International Patent Application No. PCT/CN2021/074272 are herein incorporated by reference in their entirety.

TECHNICAL FIELD

This document is directed generally to in wireless communications, and more particularly to non-coaxial estimation and compensation for orbital angular momentum communication.

BACKGROUND

Existing wireless communication technology uses linear momentum of electromagnetic wave radiation, such as in form of signal amplitude, phase, frequency, etc., to carry information. Additionally, although multiple-input multiple-output (MIMO) uses multiple transmitters and multiple receivers for spatial multiplexing, it still uses a combination of linear momentum. Orbital angular momentum (OAM) technology may expand the dimension of wireless communication and improve the efficiency of existing dimensions. However, OAM requires very high coaxiality between transceivers. The existence of small-scale offset/rotational non-coaxiality could destroy the orthogonality between OAM modes, which in turn could have a severe impact on transmission and even lead to complete transmission failure. In practical applications, antenna array installation errors, jitter caused by environmental changes, and misalignment caused by mobility of receiving and transmitting devices are all common situations that may undesirably increase non-coaxiality between transceiver devices. As such, ways to enhance coaxiality between transceivers in order to optimally employ OAM technology in wireless communication may be desirable.

SUMMARY

This document relates to methods, systems, apparatuses and devices for use of intelligent reflecting devices to determine positions of nodes in wireless communications.

In some implementations, a method for wireless communication is disclosed. The method may include: receiving, by a receiving node, an orbital angular momentum (OAM) signal from a transmitting node; determining, by non-coaxial parameter estimation node, one or more non-coaxial parameters according to the OAM signal; and selecting, by the receiving node, at least one beam from a plurality of beams for communication with the transmitting node according to the one or more non-coaxial parameters.

In some other implementations, a method for wireless communication is disclosed. The method may include: transmitting, by a transmitting node, an orbital angular momentum (OAM) signal to a receiving node; receiving, by the transmitting node, one or more non-coaxial parameters determined according to receipt of the OAM signal by the receiving node; and selecting, by the transmitting node, at least one beam from a plurality of beams for communication with the receiving node according to the one or more non-coaxial parameters.

In some other implementations, a system including one or more network devices is disclosed. The one or more network devices may include one or more processors and one or more memories, wherein the one or more processors are configured to read computer code from the one or more memories to implement any one of the methods above.

In yet some other implementations, a computer program product is disclosed. The computer program product may include a non-transitory computer-readable program medium with computer code stored thereupon, the computer code, when executed by one or more processors, causes the one or more processors to implement any one of the methods above.

The above and other aspects and their implementations are described in greater detail in the drawings, the descriptions, and the claims.

DETAILED DESCRIPTION

Figure 1:
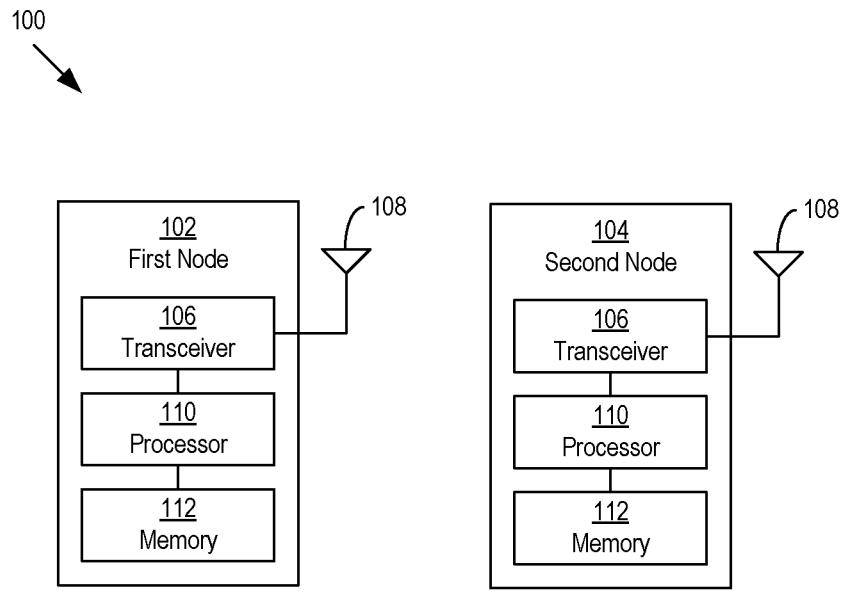
FIG. 1 shows a block diagram of an example of a wireless communication system.

The present description describes wireless communications involving estimation, feedback, and compensation of the degree of non-coaxial UCA transmission and reception. For estimation, the wireless system may determine and use true-non-coaxial parameters defined as first type of non-coaxial parameters, combined non-coaxial parameters defined as second type of non-coaxial parameters, and a deviation matrix as a third type of non-coaxial parameters.

In various embodiments, a transmitting node may transmit a signal with a P-ring UCA and/or a receiving node may receive a signal from the transmitting node with a Q-ring UCA, where $P \geq 1$ and $Q \geq 1$. Additionally, the transmitting node may include a central antenna element, and/or the receiving node may include a central antenna element for use in the orbital angular momentum (OAM) transmission. Also, a non-coaxial parameter estimation node may determine or estimate non-coaxial channels in the presence offset non-coaxiality, rotational non-coaxiality, and offset and rotational non-coaxiality. For the first or second type of non-coaxial parameters, the non-coaxial parameter estimation node may employ design traversal and/or secondary traversal techniques, channel comparison and matching selection, construction estimation equations, Bessel reception, and structural optimization problem solving in order to determine non-coaxial parameters. Traversal techniques may include dividing a parameter into M grid points over a feasible area, and traversing or searching each grid point, such as according to a certain order. In response to traversing/searching, the non-coaxial parameter estimation node may select an optimal value from among the grid points. The second traversal may include dividing the parameter into N grid points, where N is much smaller than M ($N \ll M$) in the feasible area; traversing or searching each grid point, such as according to a certain order; selecting an optimal grid point among the N grid points; and selecting a nearest left grid point and a nearest right grid point relative to the optimal grid point to define a new feasible area of grid points. The new feasible area of grid points is divided and searched again.

For embodiments that use a single antenna element for receiving and/or that use a single antenna element for transmitting, the wireless system 100 may define or use a combination of non-coaxial parameters. For the first or second type of non-coaxial parameters, the non-coaxial parameter estimation node may employ design traversal and secondary traversal, perform channel comparison and matching selection, construct estimation equations, and/or construct optimization problems to solve non-coaxial parameters. For embodiments that include multi-loop and central antenna element arrangements, additional hardware may not be required, which may significantly reduce the first or second type of non-coaxial parameter estimation.

Additionally, in various embodiments, the receiving node may have an antenna configured other than a UCA or in non-UCA form, such as a rectangular array or a hexagonal array, as non-limiting examples. For such embodiments, the non-coaxial parameter estimation node may estimate the non-coaxial parameters through signal processing or optimization methods.

Additionally, various embodiments described herein address the problem of $2\pi$ phase ambiguity when estimating non-coaxial parameters by directly compensating the deviation matrix introduced by offset and/or rotational non-coaxiality through the received signal. For such embodiments, the non-coaxial parameter estimation node may directly compensate the deviation matrix without estimating the first type of non-coaxial parameters and/or the second type of non-coaxial parameters. The non-coaxial parameter estimation node may determine the deviation matrix for the transmitting node and/or for the receiving node, and the deviation matrix may be used as the third type of non-coaxial parameters for direct compensation.

Additionally, to employ feedback, the non-coaxial parameter estimation node may analyze offset non-coaxiality, rotational non-coaxiality, and offset plus rotational non-coaxiliaty separately in order to determine the non-coaxial parameters to feed back to the transmitting node. The non-coaxial parameter estimation node may send or feedback the first type of non-coaxial parameters, the second type of non-coaxial parameters, or the third type of non-coaxial parameters, depending on the situation.

Additionally, to employ compensation, the wireless system may implement eigenvalue decomposition or channel compensation into a cyclic matrix. A compensation node may perform channel compensation for the transmitting node and/or the receiving node based on the first type of non-coaxial parameters, the second type of non-coaxial parameters, the third type of non-coaxial parameters, and/or the overall channel state information.

Orbital angular momentum (OAM) technology may be one of the key candidate technologies for advanced wireless communications, such as those employed for 6G and beyond. Additionally, a UCA antenna array may effectively use the direction and wave number dimensional resources, which may greatly increase channel capacity by expanding new dimensions and obtaining a substantial increase in spectrum efficiency. An OAM mode can carry multiple data channels, which can realize high-degree-of-freedom spatial multiplexing transmission under the line-of-sight (LOS) channel without multipath, and may address the problem of a limited number of single-users multiplexing layers under a high-frequency LOS channel. At the same time, OAM can realize OAM beam transmission and reception through relatively simple DFT transformation. The natural orthogonality of the channel may be greatly significant for reducing computational complexity. OAM technology may have great value in various applications such as microwave wireless backhaul links, point-to-point communications, and short-distance single-user ultra-high-rate data transmission.

Additionally, OAM may require very high coaxility between a two communication nodes wirelessly communicating with each other. The existence of offset non-coaxiality and/or rotational non-coaxiality can destroy the orthogonality between OAM modes, have a serious impact on OAM transmission, and could even lead to transmission failure. The present description may solve the problems created by coaxial limitation of OAM communication through the non-coaxial parameter estimation, feedback, and compensation for various OAM non-coaxial conditions. The embodiments described herein can be used to effectively handle parameter estimation and channel compensation under non-coaxial conditions and solve non-coaxial parameters. The embodiments can compensate for the negative impact that misalignment between communicating nodes can have, and OAM can support multi-user and mobility.

These and other technical improvements, advantages, and benefits will become apparent in view of the further detailed description and the accompanying drawings.

FIG. 1 shows a diagram of an example wireless communication system 100 including a plurality of communication nodes that are configured to wirelessly communicate with each other. The communication nodes includes a first node 102 and a second node 104. Various other examples of the wireless communication system 100 may include more than two communication nodes.

In general, each communication node is an electronic device, or a plurality (or network or combination) of electronic devices, that is configured to wirelessly communicate with another node in the wireless communication system, including wirelessly transmitting and receiving signals. In various embodiments, each communication node may be one of a plurality of types of communication nodes.

One type of communication node is a user device. A user include a single electronic device or apparatus, or multiple (e.g., a network of) electronic devices or apparatuses, capable of communicating wirelessly over a network. A user device may include or otherwise be referred to as a user terminal or a user equipment (UE). Additionally, a user device may be or include, but not limited to, a mobile device (such as a mobile phone, a smart phone, a tablet, or a laptop computer, as non-limiting examples) or a fixed or stationary device, (such as a desktop computer or other computing devices that are not ordinarily moved for long periods of time, such as appliances, other relatively heavy devices including Internet of things (IoT), or computing devices used in commercial or industrial environments, as non-limiting examples).

A second type of communication node is a wireless access node. A wireless access node may comprise one or more base stations or other wireless network access points capable of communicating wirelessly over a network with one or more user devices and/or with one or more other wireless access nodes. For example, the wireless access node 104 may comprise a 4G LTE base station, a 5G NR base station, a 5G central-unit base station, a 5G distributed-unit base station, a next generation Node B (gNB), an enhanced Node B (eNB), or other base station, or network in various embodiments.

As shown in FIG. 1, each communication node 102, 104 may include transceiver circuitry 106 coupled to an antenna 108 to effect wireless communication. The transceiver circuitry 106 may also be coupled to a processor 110, which may also be coupled to a memory 112 or other storage device. The processor 110 may be configured in hardware (e.g., digital logic circuitry, field programmable gate arrays (FPGA), application specific integrated circuits (ASIC), or the like), and/or a combination of hardware and software (e.g., hardware circuitry (such as a central processing unit (CPU)) configured to execute computer code in the form of software and/or firmware to carry out functions). The memory 112, which may be in the form of volatile memory, non-volatile memory, combinations thereof, or other types of memory, may be implemented in hardware, and may store therein instructions or code that, when read and executed by the processor 110, cause the processor 110 to implement various functions and/or methods described herein. Also, in various embodiments, the antenna 108 may include a plurality of antenna elements that may each have an associated phase and/or amplitude that can be controlled and/or adjusted, such as by the processor 110. Through this control, a communication node may be configured to have transmit-side directivity and/or receive-side directivity, in that the processor 110, and/or the transceiver circuitry 106, can perform beam forming by selecting a beam from among a plurality of possible beams, and transmit or receive a signal with the antenna radiating the selected beam.

Additionally, in various embodiments, the communication nodes 102, 104 may be configured to wirelessly communicate with each other in or over a mobile network and/or a wireless access network according to one or more standards and/or specifications. In general, the standards and/or specifications may define the rules or procedures under which communication nodes 102, 104 can wirelessly communicate, which may include those for communicating in millimeter (mm)-Wave bands, and/or with multi-antenna schemes and beamforming functions. In addition or alternatively, the standards and/or specifications are those that define a radio access technology and/or a cellular technology, such as Fourth Generation (4G) Long Term Evolution (LTE), Fifth Generation (5G) New Radio (NR), or New Radio Unlicensed (NR-U), as non-limiting examples.

In the wireless system 100, the communication nodes are configured to wirelessly communicate signals between each other. In general, a communication in the wireless system 100 between two communication nodes can be or include a transmission or a reception, and is generally both simultaneously, depending on the perspective of a particular node in the communication. For example, for a given communication between the first node 102 and the second node 104 where the first node 102 is transmitting a signal to the second node 104 and the second node 104 is receiving the signal from the first node 102, the first node 102 may be referred to as a sending or transmitting node (or a sending or transmitting device), the second node 104 may be referred to as a receiving node or (a receiving device), and the communication may be considered a transmission for the first node and a reception for the second node. Of course, since communication nodes in a wireless system 100 can both send and receive signals, a single communication node may be both a sending node/device and a receiving node/device simultaneously or switch between being a sending node/device and a receiving node/device.

In addition, the first node 102 and the second node 104 may each be configured to transmit and/or receive orbital angular momentum (OAM) signals. As used herein, an OAM signal is a signal having or transmitted with at least one OAM mode. OAM is a physical property is a physical property of electromagnetic (EM) waves characterized by a helical phase front in a direction of propagation. Additionally, OAM can be divided into two forms, including quantum OAM (q-OAM) and synthetic OAM (s-OAM). q-OAM is the quantum state of a photon, and refers to angular momentum generated by a light beam with a spiral phase structure. The statistical state in OAM, including for those embodiments described herein, is a spiral phase structure that uses multiple EM waves to simulate beams. s-OAM generates eddy EM waves through statistical state beam simulation of OAM. Further, an OAM mode is a feature of an OAM signal that indicates an integer number of helix turns per wavelength that an EM wave of an OAM signal has. In various embodiments, OAM modes are identified by having different numbers, different polarities, or a combination of the two, such as mode 0, mode 1, etc. Additionally, different OAM modes have different integer numbers of helix turns per wavelength. Generally, different OAM modes are orthogonal to each other. Additionally, waves with different OAM modes may carry different streams of data. An OAM signal with multiple OAM modes (also referred to as a multi-mode OAM signal) has multiple helical EM waves, with each wave having a different integer number of helix turns per wavelength. For at least some embodiments, a transmitting node may generate an OAM signal with multiple OAM modes by phase-shifting waves of different OAM modes relative to each other.

During a given communication of an OAM signal, one of the nodes 102, 104 functions as a transmitting node and the other node functions as a receiving node. The transmitting node transmits an OAM signal to the receiving node, and the receiving node receives the OAM signal from the transmitting node. Each of the first and second nodes 102, 104 may be configured in any of various ways in order to communicate OAM signals. In particular example embodiments, the antennas 108 of the first and second nodes 102, 104 are each configured as a uniform circular array (UCA) in order to generate, transmit, and/or receive OAM signals, although other antenna configurations and/or technologies in various other embodiments may be possible, such as spiral phase plate (SPP) and metamaterial, as non-limiting examples. In various embodiments, the UCA may be configured as a single loop, as multiple loops, or as a single loop or a multiple loop including a central antenna.

In various embodiments where UCAs are used, the transmitting node may implement UCA-based statistical state OAM techniques to generate an OAM signal. Additionally, the number of antennas (or antenna elements) may determine a total number of OAM modes that the transmitting node generates. When generating an OAM signal, a UCA topology adds a phase rotation of a $2\pi l/N$ to EM waves, antenna by antenna, creating the EM wavefront to have a spiral phase structure. Additionally, a transmitting UCA (i.e., a UCA used for transmitting an OAM signal) and a receiving UCA (i.e., a UCA used for receiving an OAM signal) may each be entirely symmetrical, which may allow for new or additional reuse under line-of-sight (LOS) channels to be realized. Additionally, as mentioned, OAM modes are orthogonal to each other, and can carry multiple data channels, which may realize a high-degree-of-freedom spatial multiplexing transmission under LOS channels without the need to use multiple paths, which in turn may overcome or solve the problem of limited numbers of single-user multiplexing layers under high-frequency LOS channels. Moreover, the orthogonality between multiple OAM modes may be used for interference cancellation, such as inter-cell interference, uplink and downlink interference, and full-duplex transceiver self-interference.

Additionally, during communication of OAM signals, it may be desirable for the first and second nodes 102, 104 to have as high of coaxiality between them as possible in order to ensure optimal communication of the OAM signals, including optimal orthogonality between the OAM modes. On the other hand, non-coaxiality, including offset and/or rotational non-coaxiality, even on a small scale, may degrade, worsen, or even completely destroy the orthogonality between OAM modes, which, in turn, could degrade or even cause complete failure in communication of OAM signals between the first and second nodes 102, 104.

To optimize communication of OAM signals in the wireless communication system 100, the present description describes non-coaxial estimation and compensation for communication, including transmission and reception, of OAM signals. The embodiments described herein include the first node 102 transmitting one or more signals to the receiving node 104, and the non-coaxial estimation and compensation are performed based on the one or more signals received by the receiving node 104. Accordingly, the first node 102 is referred to hereafter as the transmitting node 102, and the second node 104 is referred to as the receiving node 104. The non-coaxial estimation and compensation may allow the nodes 102, 104 to determine or acquire an accurate channel, which in turn may lead to optimal beam forming, such as by the transmitting and receiving nodes 102, 104 selecting optimal transmit and receive beams for further communication.

Figure 2:
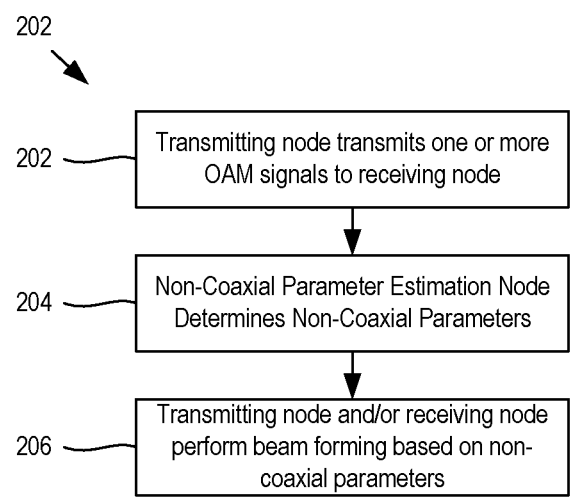
FIG. 2 shows a flow chart of an example method for wireless communication.

FIG. 2 shows a flow chart of an example method 200 for wireless communication that includes non-coaxial parameter. At block 202, in various embodiments, the transmitting node 102 may generate and transmit an OAM signal, such as in the form of a pilot signal, to the receiving node 104. The transmitting node 102 may use its transceiver circuitry 106, antenna 108, processor 110, memory 112, or any combination thereof, in order to generate and transmit the OAM signal. In response, the receiving node 104 may receive the OAM signal. The receiving node 104 may use its transceiver circuitry 106, antenna 108, processor 110, memory 112, or any combination thereof, in order to receive the OAM signal and perform subsequent channel estimation and further processing as described in further detail below.

At block 204, a non-coaxial parameter estimation node may estimate one or more OAM parameters according to the received signal. In various embodiments, the non-coaxial parameter estimation node is the receiving node 104. In other embodiments, the non-coaxial parameter estimation node is the transmitting node 102, another node in the wireless communication system 100, or any of various combinations thereof. For embodiments where the non-coaxial parameter estimation node is a node other than the receiving node 104, the receiving node 104 may generate information in response to receipt of the signal that is used to perform the various functions of the non-coaxial parameter estimation node, and transmit the information to the other node. In this way, a communication node other than the receiving node 104 may perform some or all of the functions of the non-coaxial parameter estimation. Additionally, in various embodiments, the non-coaxial parameter estimation node, and estimate a channel based on the received signal and according to one or more channel estimation algorithms (e.g., least squares (LS) or minimum mean square error (MMSE)).

Additionally, at block 204, in various embodiments, the receiving node 104 may determine or obtain one or more non-coaxial parameters in response the received OAM signal and/or the estimated channel it determines. The receiving node 104 may select the OAM signal (e.g., the pilot signal) as an orthogonal matrix in order to distinguish different OAM modes. Selecting an orthogonal matrix may include selecting a corresponding column from a discrete Fourier transform (DFT) matrix, for example. In addition or alternatively, the receiving node 104 may determine non-orthogonal pilot sequences with lower coherence. Doing so may reduce the demand for orthogonal pilot resources.

Figure 3:
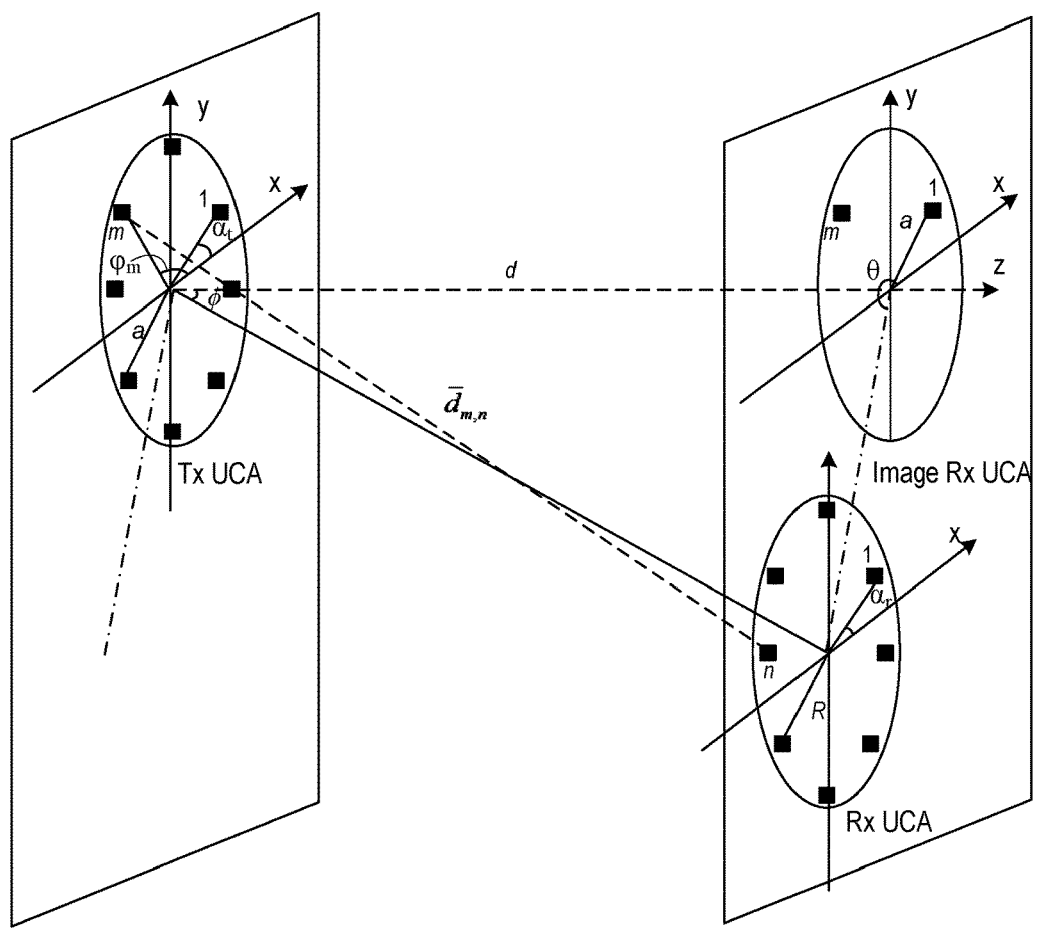
FIG. 3 is a diagram illustrating offset non-coaxiality.

Additionally, two non-coaxial parameters include offset non-coaxiality and rotational non-coaxiality. FIG. 3 shows examples of offset non-coaxiality. Offset non-coaxiality exists between the transmitting node 102 and the receiving node 104 where lines perpendicular to planes in which UCAs of the transmitting and receiving nodes 102, 104 respectively reside, and that intersect center points of the respective UCAs, are not the same. Offset non-coaxial parameters (i.e., parameters that describe non-coaxial offset) include the offset azimuth angle φ and the offset rotation angle θ. As shown in FIG. 3, the offset azimuth angle φ for a given first node relative to a second node is the angle between a first line intersecting a center point of the UCA of the first node and perpendicular to a plane in which the UCA resides, and a second line that intersects both the center point of the UCA of the first node and the center point of the UCA of the other, second node. The offset rotation angle θ may be determined with an image UCA of the second node, which may be a virtual UCA of the second node having a center point that is intersected by a line intersecting the center point of the second node and perpendicular to a plane in which the UCA of the first node resides. Additionally, the image UCA and the actual UCA of the second node may reside in the same or a common plane. Also, as shown in FIG. 3, each UCA (actual and virtual) may define an associated set of x, y, and z-axes, the intersection of which is the center point of the associated UCA. For a given set, the x and y axes reside in the plane in which the associated UCA resides, and the z-axis is perpendicular to the plane. The offset rotation angle θ is an angle defined between the x-axis of the image UCA and a line connecting center points of the image and actual UCAs, as shown in FIG. 3.

Other offset non-coaxial parameters include: an amount of movement $x_0$ of the receiving UCA in an x-direction (i.e., a direction parallel with the x-axis); and an amount of movement $y_0$ of the receiving UCA in a y-direction (i.e., a direction parallel with the y-axis). Additionally, movement of the receiving UCA in a z-direction (i.e., a direction parallel with the z-axis) is referred to as a transmission distance, and generally does not affect the orthogonality among the OAM nodes. The amounts of movements $x_0$ and $y_0$ may be determined according to the following mathematical equations:

$$x_0 = d \sin\varphi \cos\theta$$

$$y_0 = d \sin\varphi \sin\theta$$

Figure 4:
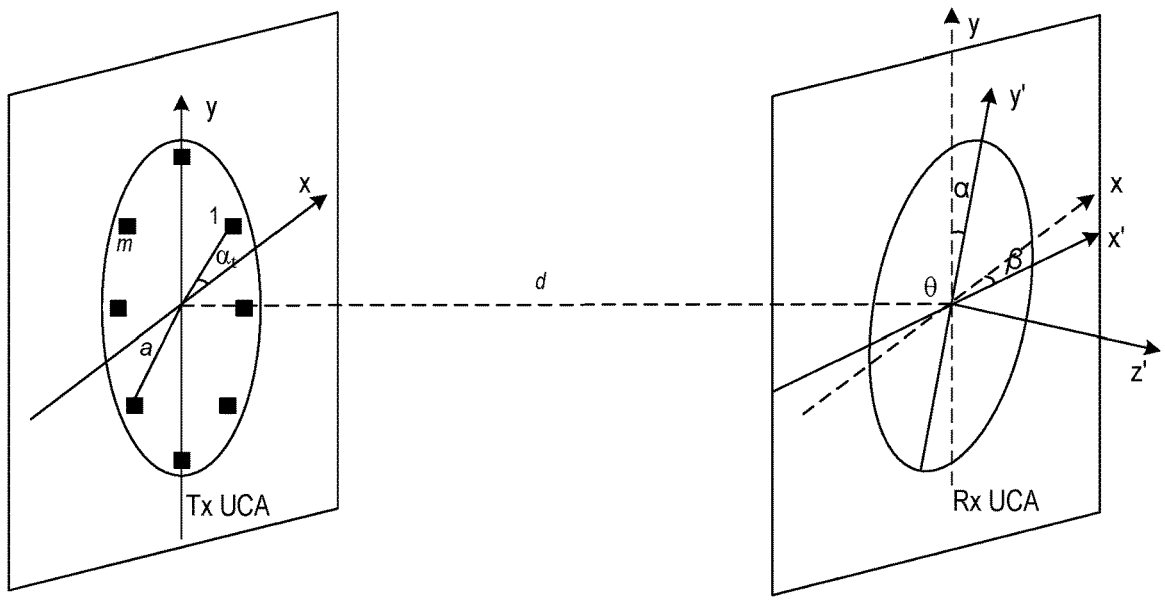
FIG. 4 is a diagram illustrating rotational non-coaxiality.

In addition, rotational non-coaxiality means that a line intersects both the center point of the transmitting UCA and the center point of the receiving UCA and is perpendicular to the plane in which the transmitting UCA resides, but the plane in which the transmitting UCA resides and the plane in which the receiving UCA resides are not parallel with each other. FIG. 4 shows rotational non-coaxiality between transmitting and receiving nodes 102, 104. Rotational non-coaxial parameters (i.e., parameters that describe rotational non-coaxiality) include the rotation angle around the x-axis α and the rotation angle around the y-axis β. Rotation around the z-axis generally does not change the parallelism between the transmitting UCA and the receiving UCA.

The following describes methods of determining or estimating non-coaxial parameters for OAM transmission. For at least some of the methods, the transmitting and receiving of the OAM signals is performed using UCAs at both the transmitting and receiving ends. The non-coaxial parameters that are determined include: the offset azimuth angle $\phi$, the offset rotation angle $\theta$, the rotation angle around the x-axis α, and the rotation angle around the y-axis β. A non-coaxial parameter estimation node may determine or estimate the non-coaxial parameters. In various embodiments, the non-coaxial parameter estimation node is the receiving node 104, although it may be the transmitting node 102 or any other communication node in the wireless communication system 100, in any of various other embodiments. The non-coaxial parameter estimation node may determine the non-coaxial parameters in order to estimate the channel as a cyclic matrix or a matrix that is closest to a coaxial LOS channel. In various embodiments, as used herein, these non-coaxial parameters may be referred to as combined parameters and/or a second-type of non-coaxial parameters.

In order to determine or obtain non-coaxial parameters, including the offset azimuth angle $\phi$, the offset rotation angle $\theta$, the rotation angle around the x-axis α, and the rotation angle around the y-axis 3, the non-coaxial parameter estimation node may traverse sets of preset grid points to obtain a parameter values that provide an estimated channel that is closest to a circulant matrix and/or a coaxial LOS channel. Each set of preset grid points may be associated with a respective one of the non-coaxial parameters. That is, the offset azimuth angle $\phi$ may have an associated set of preset grid points, the offset rotation angle $\theta$ may have an associated set of preset grid points, the rotation angle around the x-axis α may have an associated set of preset grid points, and the rotation angle around the y-axis β may have an associated set of preset grid points. For a given set of preset grid points associated with a given non-coaxial parameter, the non-coaxial parameter estimation node may traverse the set of grid points, and select a parameter value from the grid points for the given non-coaxial parameter.

In addition, for situations where the degree of non-coaxiality between the nodes 102, 104 does not change or changes slowly, the degree of non-coaxiality does not change or changes insignificantly over one sub-frame. For such situations, the complexity involved to determine the estimated channel may be acceptable. However, for situations where the complexity is too great, the non-coaxial parameter estimation node may perform a two-step approach or second-order search method in order to determine the parameter value. In particular, the non-coaxial parameter estimation node may, for a given non-coaxial parameter, first perform a coarse search that divides the preset grid points into a set of coarse grid points that establishes a rough range of non-coaxial parameters. Then, the non-coaxial parameter estimation node may perform a refined search through the set of course grid points or rough range of non-coaxial parameters to determine a fine grid point value for the given non-coaxial parameter. In various embodiments, the non-coaxial parameter estimation node may perform the two-step approach for each of the non-coaxial parameters.

Additionally, in various embodiments, in order to determine or obtain the offset azimuth angle $\phi$, the offset rotation angle $\theta$, the rotation angle around the x-axis α, and the rotation angle around the y-axis β, the non-coaxial parameter estimation node may establish a channel comparison table corresponding to different deviations of each non-coaxial parameter and make selections based on matching or corresponding non-coaxial parameters.

In addition or alternatively, in various embodiments, the non-coaxial parameter estimation node may determine or obtain the offset azimuth angle $\phi$, the offset rotation angle $\theta$, the rotation angle around the x-axis α, and the rotation angle around the y-axis β by constructing or using parameter estimation equations according to channel expressions, and analyze parameters through channel estimation methods such as LS and/or MMSE.

Additionally, in various embodiments, the transmitting node 102 and the receiving node 104 may have or utilize single antennas (or antenna elements) in order to simplify the estimation and compensation schemes using OAM. For example, the UCA of the transmitting node 102 and/or the receiving node 104 may have a central antenna element at the center of the UCA. The central antenna element of the transmitting node 102 may transmit a mode 0 OAM signal (e.g., a mode 0 OAM pilot signal) to the receiving node 104. The receiving node 104 may receive the mode 0 OAM signal, and the non-coaxial parameter estimation node (which may be the receiving node 104 in various embodiments) may estimate the non-coaxial parameters, including the offset azimuth angle $\phi$, the offset rotation angle $\theta$, the rotation angle around the x-axis α, and the rotation angle around the y-axis β, based on the mode 0 OAM signal. To do so, the non-coaxial parameter estimation node may determine a channel estimation result by comparing the modulus values of the channel elements, and determining a set of corresponding non-coaxial offset parameters that render the modulus values of each channel element closest to each other. That set of corresponding non-coaxial offset parameters may be or otherwise indicate the channel estimation result. In various embodiments, the non-coaxial parameter estimation node may use a parameter estimation equation that is constructed according to the channel estimation result or expression, and may analyze the non-coaxial parameters using channel estimation methods such as LS and/or MMSE.

Figure 5:
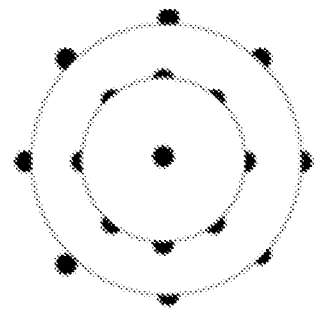
FIG. 5 shows various types of antennas that may be used for OAM communication.
Figure 5:
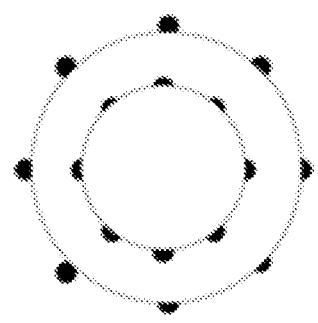
Figure 5:
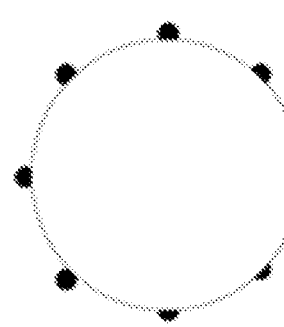

As mentioned, the UCA of the transmitting node 102 may be a single loop UCA antenna array, a multi-loop UCA antenna array, or a UCA with a center antenna element. FIG. 5 shows different antenna configurations that may be used by the transmitting node 102 and/or the receiving node 104, for the various embodiments described herein. For the receiving node 104, the receiving UCA may include a center antenna element. The non-coaxial parameter estimation node may estimate the offset azimuth angle and/or the offset rotation angle $\theta$ based on an OAM signal received at the center antenna element. Additionally, in various embodiments, the transmitting node 102 may transmit the OAM signal in multiple different OAM modes in different time slots. In other embodiments, the antenna 108 of the receiving node 104 may be in a non-UCA format. For example, the receiving antenna 108 may be configured as a rectangular array or a hexagonal array, as non-limiting examples of non-UCA formats. For such embodiments, the non-coaxial parameter estimation node may estimate the non-coaxial parameters according to signal processing and/or optimization.

Additionally, in various embodiments, when performing a non-coaxial parameter estimation process, the non-coaxial parameter estimation node (e.g., the receiving node 104) may determine true non-coaxial parameters-which may be the offset azimuth angle $\phi$, the offset rotation angle $\theta$, the rotation angle around the x-axis α, and the rotation angle around the y-axis β—according to mathematical functions or methods. Additionally, the non-coaxial parameter estimation node may estimate a combination of the true non-coaxial parameters $X_T$, $\delta_T$ and $X_R$, $\delta_R$, where T is used to denote the transmitting side, and R is used to denote the receiving side. Additionally, the complexity involved with estimating a combination of the true non-coaxial parameters may be relatively low because the influence of the real non-coaxial parameters on the channel is interleaved, such as denoted by the below mathematical formulas for X and δ. The non-coaxial parameter estimation node can directly use the true non-coaxial parameters directly for channel compensation. In various embodiments, the non-coaxial parameter estimation node may determine a combination of the true non-coaxial parameters according to the following mathematical equations:

$X_R$=Sin φCOS θ−Sin β,COS φ,$\delta_R$=sin φ sin θ+sin αcos φ+sin α sin,β sin φcos θ

$X_T$=Sin φCOS θ,$\delta_T$=sin φ sin θ

In various embodiments, when the non-coaxial parameter estimation node determines that the degree of non-coaxiality is small (e.g., below a threshold value), the non-coaxial parameter estimation node may estimate combined of non-coaxial parameters with sufficient accuracy, and in turn may perform channel compensation without determining or obtaining the true non-coaxial parameters. For such situations, the combined parameters may be referred to as the "second-type of non-coaxial parameters."

Due to the possibility of 2π phase ambiguity, when non-coaxial scaling is large, it is possible that the non-coaxial parameter estimation node could estimate the true non-coaxial parameters and/or the combined non-coaxial parameters with sufficiently large errors or even fail at estimating them. To guard against this, the non-coaxial parameter estimation node may utilize a channel deviation matrix (or just deviation matrix) that is introduced by the offset and/or rotation non-coaxial parameters. The elements of a deviation matrix may be referred to as channel deviation parameters (or just deviation parameters). The non-coaxial parameter estimation node may determine, derive or obtain the deviation matrix from, including directly from, the received OAM signal in order determine for the non-coaxial channel. For such situations, the deviation matrix and/or its deviation parameters may be referred to or expressed as the "third type of non-coaxial parameters."

For situations where only offset non-coaxiality exists between the transmitting and receiving nodes 102, 104, the non-coaxial parameter estimation node may determine or obtain the deviation matrix by estimating the deviation matrix for the transmitting side or for the receiving side. This may be the case since the deviation matrix for the transmitting and receiving sides may be the same when only offset non-coaxiality exists between the transmitting and receiving nodes 102, 104. For situations where there is only rotational non-coaxiality, the non-coaxial parameter estimation node may determine or obtain the deviation matrix only by estimating the deviation matrix for the receiving side. For situations where offset non-coaxiality and rotational non-coaxiality coexist or exist simultaneously, the non-coaxial parameter estimation node may determine or obtain the deviation matrix through bilateral measurement by estimating the deviation matrix for both the transmitting side and for the receiving side.

Additionally, in various embodiments, the non-coaxial parameter estimation node may determine or estimate the degree of non-coaxiality by constructing an optimization problem. For example, for situations where rotational non-coaxiality and/or offset non-coaxiality, the non-coaxial parameter estimation node may determine the channel according to the following mathematical formula:

$H_a$=BHA

A=diag(a)

B=diag(b)

where H represents the coaxial channel, A represents the deviation matrix due to offset non-coaxiality, B represents the deviation matrix due to rotational non-coaxiality, a represents a vector that contains the diagonal elements of A, and its element value is estimated by an optimization problem, and b represents a vector that contains the diagonal elements of B, and its element value is similarly estimated by an optimization problem.

Likewise, the non-coaxial parameter estimation node may determine or obtain the deviation matrices A and B by constructing an optimization problem. As mentioned, the transmitting node 102 may transmit an OAM signal Y to the receiving node 104. The non-coaxial parameter estimation node may determine the deviation matrix according to the following optimization goals.

For embodiments where both the transmitting node 102 and the receiving node 104 include UCAs for both transmission and receipt of an OAM signal, the non-coaxial parameter estimation node may aim to estimate a channel in cyclic form, maximize transmission capacity, and maximize an equivalent channel. For example, the non-coaxial parameter estimation node may utilize channel diagonalization after a discrete Fourier transform (DFT) is performed for transmission of the OAM signal and an inverse discrete Fourier transform (IDFT) is performed for receipt of the OAM signal, and determine or select a beam with a shape that provides a maximum signal strength and/or intensity at one position and/or a minimum signal strength and/or intensity at another position. The non-coaxial parameter estimation node may select the beam according to transmission parameters such as the radius of the transmitting UCA, distance between the transmitting node and the receiving node, and frequency of the signal being transmitted, as non-limiting examples.

Additionally, for embodiments where the transmitting antenna 108 of the transmitting node 102 includes a single antenna element to transmit the OAM signal and the receiving antenna 108 of the receiving node 104 includes a UCA to receive the OAM signal, or embodiments where the transmitting antenna 108 includes a UCA to transmit the OAM signal and the receiving antenna 108 includes a single antenna element to receive the OAM signal, the non-coaxial parameter estimation node may utilize an optimization goal that aims to make the channel elements closest to an equivalent vector, maximize transmission capacity, and determine or select a beam with a shape that provides a maximum signal strength and/or intensity at one position and/or a minimum signal strength and/or intensity at another position.

Also, for embodiments where the receiving node 104 includes a matrix array, a hexagonal array, or other array structure, the non-coaxial parameter estimation node may utilize an optimization goal that aims to make the channel element closest to a line-of-sight (LOS) channel under the corresponding offset non-coaxiality and/or rotation non-coaxiality, and determine or select a beam with a shape that provides a maximum signal strength and/or intensity at one position and/or a minimum signal strength and/or intensity at another position.

Additionally, in various embodiments, the non-coaxial parameter estimation node may perform Bessel function analysis on the receiving side based on one or more characteristics of OAM mode transmission. OAM mode transmission characteristics may include: the same receiving plane perpendicular to a propagation axis of a received signal, a distribution, in a ring shape, of an amplitude of a received signal, and a rotational transformation presented by an angle of the received signal. Additionally, positive and negative OAM modes have the same amplitude but opposite angles at the same spatial position. The received signal amplitude starts from an origin of the receiving plane and behaves according to a Bessel distribution. The OAM transmission patter may also be affected by any of various characteristics or properties of the OAM signal and/or the OAM communication technology, such as frequency, UCA radius, number of antenna elements of the UCA, and transmission distance between the transmitting and receiving nodes 102, 104, as non-limiting examples. For embodiments where the transmitting node includes a single-loop UCA array to transmit an OAM signal, the attenuation of the transmitted OAM signal satisfies or meets a Bessel distribution. When the non-coaxial parameter estimation node analyzes or determines offset non-coaxiality and/or rotational non-coaxiality, the non-coaxial parameter estimation node may determine or analyze a modulus value of the corresponding received OAM signal, and in response, may determine one or more corresponding non-coaxiality parameters according to the distribution of the Bessel function.

However, the non-coaxial parameter estimation node may not simultaneously determine two non-coaxial offset parameters from a single Bessel function point, as a given function value of the Bessel function may correspond to multiple parameter values. To illustrate an example scenario, an error of the channel caused by offset non-coaxiality and/or rotational non-coaxiality may be within a range of the main lobe of the Bessel function. For such situations, the non-coaxial parameter estimation node may select the smallest estimated parameter from a plurality of estimated parameters corresponding to one or more points due or related to the non-monotonic properties of the Bessel function as the non-coaxial parameter estimation result. However, when the error caused by offset and/or rotational non-coaxiality is not within a range of the main lobe of the Bessel function, the non-coaxial parameter estimation node may estimate multiple sets of non-coaxial parameters based on the received OAM signal, and in response, select a closest non-coaxial parameter from the multiple sets of non-coaxial parameters that is closest to the true non-coaxial parameters. An example closest non-coaxial parameter may be an angle of the OAM signal received by the transmitting node 104. In other example embodiments, the transmitting node 102 may include a multi-loop UCA. Such embodiments may function to narrow the range of non-coaxial parameters.

Additionally, in various embodiments, the amount of offset non-coaxiality (or the amount of offset coaxiality error) is equivalent to twice the rotation of the transmitting node 102 and the receiving node 104. That is, the transmitting node 102 is rotated by the offset azimuth angle $\phi$ and the receiving node 104 is rotated by negative (opposite polarity) of the offset azimuth angle $-\phi$. For such embodiments, the non-coaxial parameter estimation node may decompose the offset non-coaxiality into respective rotations of the transmitting node 102 and the receiving node 104, and may determine or obtain the non-coaxial parameters by performing rotating channel estimation, which is a channel estimation algorithm used when only rotational non-coaxiality is present. Further details are provided below in Case 2.

Additionally, for embodiments utilizing multi-loop UCA distribution and/or multi-loop MIMO between the transmitting node 102 and the receiving node 104, the nodes 102, 104 may make full use of spatial dimension resources and perform OAM communication based on OAM mode resources since different OAM modes may carry independent signals without interfering with each other. Additionally, for various embodiments where the transmitting node 102 and/or the receiving node 104 has a multi-loop UCA, use of the multi-loop UCA may function to average out the impact that noise may have on the estimation accuracy of the non-coaxial parameters, including the true non-coaxial parameters, the combined non-coaxial parameters, and/or the deviation matrix. The multi-loop UCAs may be designed in order to optimize the averaging and minimize the impact of the noise. Additionally, as mentioned, use of multi-loop UCAs may function to narrow the range of non-coaxial parameters, which may have a positive significance for acquiring the non-coaxial parameters and improving OAM transmission performance.

Additionally, in various embodiments where the non-coaxial parameter estimation node determines or obtains the true non-coaxial parameters, such as through estimation, the non-coaxial parameter estimation node (e.g., the receiving node 104) may send or feedback the offset azimuth angle $\phi$, the offset rotation angle $\theta$, the rotation angle around the x-axis $\alpha$, and the rotation angle around the y-axis $\beta$ to the transmitting node 102. Also, in various embodiments where the non-coaxial parameter estimation node determines or obtains the combined non-coaxial parameters, such as through estimation, the non-coaxial parameter estimation node (e.g., the receiving node 104) may send or feedback the combined parameters (for example $X_T$ and/or $\delta_T$ as described above) to the transmitting node 102 for channel compensation. In addition, in various embodiments where the non-coaxial parameter estimation node determines or obtains a deviation matrix, such as through estimation, the non-coaxial parameter estimation node (e.g., the receiving node 104) may send or feedback the deviation matrix to the transmitting node 102.

As mentioned, the transmitting node 102, the receiving node 104, the non-coaxial parameter estimation node (which may be the receiving node 104 or any other node), or any other node in the wireless system 100 may estimate the channel by the transmitting node 102 transmitting one or more OAM signals to the receiving node 104 (such as in the form of pilot signals). For various embodiments, the non-coaxial parameter estimation node may determine or estimate the channel according to single value decomposition (SVD), such as according to the following mathematical formula:

$$H = U\Sigma V^H$$

where H is the estimated channel, U is unitary matrix including left eigen-vectors, an V is a unitary matrix including right eigen-vectors. For such embodiments, the non-coaxial parameter estimation node may send or feedback the matrix V to the transmitting node 102.

Additionally, where non-coaxiality exists between the transmitting and receiving nodes 102, 104, the channel may not be expressed in the form of a circulant matrix. Additionally, the orthogonality between OAM modes may be destroyed, and the advantages of OAM may be difficult to realize. In various embodiments, the non-coaxial parameter estimation node may determine or estimate channel deviation parameters (which may be scalar values) through channel estimation, and may represent or express them as a diagonal matrix. For at least some embodiments, a channel deviation parameter may have an element number that is larger than element numbers of other, above-described, non-coaxial parameters or combined non-coaxial parameters, and send or feedback the channel deviation parameters and/or combined non-coaxial parameters to the transmitting node 102. In response, the transmitting node 102 may perform channel compensation according to the channel deviation parameters and/or the combined non-coaxial parameters. For at least some of these embodiments, the non-coaxial parameter estimation node may estimate channel deviation parameters (in the form of a vector in some examples) according to the following mathematical formula:

$$H=BH^{C}A$$

where H is the estimated channel, A is a channel deviation matrix on the transmitting side, B is a channel deviation matrix on the receiving side, and C is the real channel without compensation. Upon determining the channel deviation matrix A for the transmitting side, the non-coaxial parameter estimation node may send or feedback the channel deviation matrix A and/or one or more of its channel deviation parameters to the transmitting node 102. In response, the transmitting node 102 may perform channel compensation (e.g., beam forming) based on the channel deviation matrix A and/or the one or more channel deviation parameters that it receives.

Additionally, in various embodiments, the non-coaxial parameter estimation node may perform precoding based on SVD in order to perform channel compensation through direct SVD channel decomposition. In addition or alternatively, the transmitting node 102, the non-coaxial parameter estimation node may transform the channel into an equivalent circulant matrix based on an algorithm that combines the estimated channel and coaxial channel SVD. Such an algorithm may use overall channel state information (CSI), is not limited to the channel model, and may achieve relatively consistent mean square error (MSE) for all rotation angles.

At block 206, the transmitting node 102 and/or the receiving node 104 may each perform respective beam forming and determine a respective beam from a plurality of beams for optimal communication based on the one or more non-coaxial parameters determined at block 204. In particular embodiments, the transmitting node 102 may perform beamforming based on the set of channel deviation parameters A for the transmitting side, and/or the receiving node 104 may perform beam forming based on the set of channel deviation parameters B for the receiving side. For example, the transmitting node 102 may determine a compensation matrix corresponding to the set of channel deviation parameters A, and select a beam according to the determined compensation matrix. Similarly, the receiving node 104 may determine a compensation matrix corresponding to the set of channel deviation parameters B, and select a beam according to the determined compensation matrix.

The following describes different cases for different coaxiality conditions, different antenna topologies, non-coaxial parameter estimation methods, and channel compensation methods.

Case 1

In a first case (Case 1), a UCA shifting non-coaxial channel modeling solution is employed by analyzing a distance between the transmitting and receiving antennas after non-coaxial shifting in order to construct a transmission channel. For this case, the non-coaxial parameter estimation node may determine a channel expression (or channel matrix expression) $h_{m,n}$ according to the following mathematical equation:

$$h_{m,n} = \frac{G\lambda}{4\pi\sqrt{d^2+a^2+R^2}} \exp\left(\frac{-j2\pi\sqrt{d^2+a^2+R^2}}{\pi}\right) \times$$

$$\exp\left(\frac{j2\pi}{\lambda} \frac{aR\cos(\varphi_n+\alpha_r-\varphi_m-\alpha_t)+ dR\sin\phi\cos(\varphi_n+\alpha_r-\theta)-ad\sin\phi\cos(\varphi_m+\alpha_t-\theta)}{\sqrt{R^2+a^2+d^2}}\right)$$

where m is an index for an mth antenna element of a transmitting UCA, n is an index for an nth antenna element of a receiving UCA, M is a total number of antenna elements of the transmitting UCA, N is a total number of antenna elements of the receiving UCA, $\alpha$ is the radius of the transmitting UCA, d is a transmission distance between the transmitting node 102 and the receiving node 104, $\alpha_t$ is an angular difference between a first antenna element of the M-number of antenna elements and the x-axis, R is the radius of the receiving UCA, $\alpha_r$ is an angular difference between a first antenna element of the N-number of antenna elements of the transmitting UCA and the x-axis, $\varphi_m$ is the offset azimuth angle for an mth element of the transmitting UCA, and $\varphi_n$ is the offset azimuth angle for an nth element of the receiving UCA. $\phi$ The non-coaxial parameter estimation node may determine the offset azimuth angle $\phi$ and the offset rotation angle $\theta$ by constructing a diagonal matrix that satisfies the following:

$$[G_M]_{i,i} = \exp\left(\frac{j2\pi\sin\gamma}{\lambda}a\cos(\phi_i-\vartheta)\right),$$

$$[G_N]_{j,j} = \exp\left(\frac{-j2\pi\sin\gamma}{\lambda}R\cos(\phi_j-\vartheta)\right)$$

where the processed channel G is expressed as:

$$G=G_N H G_M.$$

where $G_M$ is the beamforming matrix on the transmitting side, $G_N$ is the beamforming matrix on the receiving side; i and j are indices for an ith antenna element of the transmitting node 102 and a jth antenna element of the receiving node 104; $\vartheta$ is an estimation of the offset rotation angle $\theta$, and $\gamma$ is an estimation of the offset azimuth angle $\phi$.

In the case where the offset azimuth angle $\phi$ is equal to $\gamma$, and the offset rotation angle $\theta$ is equal to 9, G is a circulant matrix. To obtain the offset azimuth angle $\phi=\gamma$, and the offset rotation angle $\theta=\vartheta$, the non-coaxial parameter estimation node may traverse each of a set of estimated offset azimuth values $\gamma$ and a set of estimated rotation values $\vartheta$ to identify a set of non-coaxial offset azimuth and rotation parameter values $\phi$, $\theta$ that yields a channel expression h closest to the circulant matrix G. For such embodiments, the channel expression h may be a coaxial LOS channel. At this time, the non-coaxial parameter estimation node may use or identify the two variables $\gamma$ and $\vartheta$ in the diagonal matrix satisfying the above equations. Accordingly, the traversal of the set of estimated offset azimuth values $\gamma$ and the set of estimated rotation values $\vartheta$, combination, may be two-dimensional, which may provide more complexity. In addition or alternatively, the non-coaxial parameter estimation node may access or otherwise use a channel comparison table (which may be stored in a memory) that includes different deviations or different azimuth and rotation values. The non-coaxial parameter estimation node may select an offset azimuth angle value φ and an offset rotation angle value θ from the table that provides a channel expression h that is closest to the circulant matrix G. In other embodiments, the non-coaxial parameter estimation node may construct a linear programming problem to determine the offset non-coaxial parameters φ, θ.

Such methods may be extended to P-loop UCA transmission and Q-loop UCA reception, where P≥1, Q≥1, and the transmitting UCA and/or the receiving UCA includes a central antenna element. For such embodiments performing P-loop transmission and/or Q-loop reception, the non-coaxial parameter estimation node may perform similar traversal, table lookup, and/or linear programming, as previously described, in order to obtain the offset azimuth and rotation non-coaxial parameter angles φ, θ. The non-coaxial parameter estimation node may send or feedback the offset azimuth angle value φ and/or an offset rotation angle value θ to the transmitting node.

Case 2

A second case (Case 2) includes a UCA transceiver non-coaxial channel modeling solution. For such embodiments, the non-coaxial parameter estimation node determines or analyzes a distance d between the transmitting antenna of the transmitting node 102 and the receiving antenna of the receiving node 104 after rotation in order to construct the transmission channel. To do so, the non-coaxial parameter estimation node may determine a channel expression $h_{m,n}$ according to the following mathematical formula:

$$h_{m,n} \approx \frac{G\lambda}{4\pi\sqrt{d^2+a^2+R^2}}\exp\left(-\frac{j2\pi\sqrt{R^2+a^2+d^2}}{\lambda}\right)\times$$

$$\exp\left(\frac{j2\pi}{\lambda}R(\cos\varphi_n\sin\beta-\sin\varphi_n\sin\alpha\cos\beta)\right)\times$$

$$\exp\left(\frac{j2\pi}{\lambda}\frac{Ra}{d}(\cos\varphi_m\cos\varphi_n\cos\beta+\sin\varphi_m\sin\varphi_n\cos\alpha+\sin\varphi_n\cos\varphi_m\sin\alpha\sin\beta)\right)$$

where G is defined according to the following mathematical formulas:

$G=HG_N$ where $G_N$ is a diagonal matrix, and $$[G_N]_n = \frac{G\lambda}{4\pi\sqrt{R^2+d^2+a^2}}\exp\left(-\frac{j2\pi}{\lambda}\sqrt{R^2+d^2+a^2}\right)\times$$

$$\exp\left(-\frac{j2\pi}{\lambda}R(\cos\varphi_n\sin\mu-\sin\varphi_n\sin\nu\cos\mu)\right)\times$$

$$\exp\left(-\frac{j2\pi}{\lambda}\frac{Ra}{d}(\cos\varphi_m\cos\varphi_n\cos\mu+\sin\varphi_m\sin\varphi_n\cos\nu+\sin\varphi_n\cos\varphi_m\sin\nu\sin\mu)\right)$$

When using the above mathematical formulas, the non-coaxial parameter estimation node may equate ν=α, and η=β. For such embodiments, G is a LOS channel. Additionally, for such embodiments, the non-coaxial parameter estimation node may perform one-dimensional traversal when there is a single-dimensional rotation (i.e., only around the x-axis or only around the y-axis), and may perform two-dimensional traversal may when there is two-dimensional rotation (i.e., rotation around both the x-axis and the y-axis). Additionally, for various embodiments, the non-coaxial parameter estimation node may traverse each of ν and μ in order to determine or obtain values for the rotational non-coaxial parameters α, β that provide a channel expression $h_{m,n}$ closest to the circulant matrix G. In any of various other embodiments, similar to Case 1, the non-coaxial parameter estimation node may use a channel comparison table (which may be stored in a memory) that includes different deviations, and/or construct a linear programming problem to determine the rotational non-coaxial parameters.

Also, similar to Case 1, such embodiments may be extended to P-loop UCA transmission and Q-loop UCA reception, where P≥1, Q≥1, and the transmitting UCA and/or the receiving UCA includes a central antenna element. For such embodiments performing P-loop transmission and/or Q-loop reception, the non-coaxial parameter estimation node may perform similar traversal, table lookup, and/or linear programming, as previously described, in order to obtain the rotational non-coaxial parameters, which may include the rotation angle around the x-axis α and the rotation angle around the y-axis β. The non-coaxial parameter estimation node may send or feedback the rotational non-coaxial parameters to the transmitting node.

Case 3

In a third case (Case 3), when the transmitting node 102 and/or the receiving node 104 include a UCA, and both offset and rotation non-coaxiality is present between the nodes 102, 104, the non-coaxial parameter estimation node may determine a channel expression $h_{n,m}$ according to the following mathematical formula:

$$h_{n,m} = \frac{G\lambda}{4\pi d}\exp\left(-jk\sqrt{R^2+a^2+d^2}\right)\times\exp\left(jk\frac{aR}{d}\cos(\varphi_m-\varphi_n)\right)\times$$

$$\exp(-jka\sin\phi\cos(\varphi_m-\theta))\times\exp(jkR\sin\phi\cos(\varphi_n-\theta))\times$$

$$\exp(-jkR\cos\varphi_n\sin\beta\cos\phi)\times\exp(jkR\sin\varphi_n\sin\alpha\cos\phi)\times$$

$$\exp(jkR\sin\varphi_n\sin\alpha\sin\beta\sin\phi\cos\theta)\times\exp\left(jk\frac{aR}{d}\cos\varphi_m\sin\varphi_n\sin\alpha\sin\beta\right)$$

The embodiments for Case 3 may be similar to Cases 1 and 2, in that the non-coaxial parameter estimation node may determine a non-coaxial parameter value for each of the offset azimuth angle value φ, the offset rotation angle value θ, the rotation angle around the x-axis α, and the rotation angle around the y-axis R by traversing sets of parameter values, each associated with one of the non-coaxial parameters φ, θ, α, β, similar to the traversal as previously describe for Cases 1 or 2. In other embodiments, the non-coaxial parameter estimation node may access a comparison table (which may be stored in a memory), or construct a linear programming problem, in order to determine values for the offset and rotation non-coaxial parameters φ, θ, α, β. Also, similar to Cases 1 and 2, such embodiments for Case 3 may be extended to P-loop UCA transmission and Q-loop UCA reception, where P≥1, Q≥1, and the transmitting UCA and/or the receiving UCA includes a central antenna element. For such embodiments performing P-loop transmission and/or Q-loop reception, the non-coaxial parameter estimation node may perform similar traversal, table lookup, and/or linear programming, as previously described, in order to obtain the offset non-coaxial parameters (the offset azimuth angle φ and the offset rotation angle value θ), and/or the rotational non-coaxial parameters including the rotation angle around the x-axis α and the rotation angle around the y-axis β. The non-coaxial parameter estimation node may send or feedback the non-coaxial parameters to the transmitting node.

Case 4

In a fourth case (Case 4), the non-coaxial parameter estimation node may determine a channel variation for channel elements (n, m) according to an offset error or non-coaxiality according to the following mathematical formula:

$$\exp\left(\frac{j2\pi\sin\phi}{\lambda}(R\cos(\varphi_n - \theta) - a\cos(\varphi_m - \theta))\right).$$

where m is an index for an mth antenna element of the transmitting node 102, and n is an index for an nth antenna element of the receiving node 104, and X is the wavelength of the signal. For such embodiments, the non-coaxial parameter estimation node may determine corresponding elements or parts $a_m$ and $b_n$ of the channel variation according to the following mathematical formulas:

$$a_m = \exp\left(\frac{-j2\pi\sin\phi}{\lambda}a\cos(\varphi_m - \theta)\right)$$

$$b_n = \exp\left(\frac{j2\pi\sin\phi}{\lambda}R\cos(\varphi_n - \theta)\right)$$

During OAM transmission, the transmitting node 102 may transmit an OAM signal $X_p$ (such as a pilot signal), which may be received by the receiving node 104. The received signal $Y_p$ may be mathematically expressed as:

$$Y_p = H_a X_p + N_p$$

where $H_a$ is represents the OAM channel and Np is the noise matrix.

For such embodiments, the non-coaxial parameter estimation node may estimate the channel H according to the following mathematical formula:

$$\hat{H}_a = Y_p X_p^H (X_p X_p^H)^{-1} = H_a + N_a = BHA + N_a$$

where $X^H_p$ is the Hermitian of signal $X_p$, A is a deviation matrix for the transmitting node 102, B is a deviation matrix for the receiving node 104, and Na is a noise matrix after estimation, such that $N_a = N_p X_p^H (X_p X_p^H)^{-1}$ Additionally, for such embodiments, the non-coaxial parameter estimation node may vectorize the estimated channel $\hat{H}_a$, such as according to the following mathematical formula:

$$\hat{h}_a = vec(\hat{H}_a) = (A^T \otimes B)vec(H) + vec(N_a) = vec(ba^T) \circ h + n_a$$

The non-coaxial parameter estimation node may have the goal of determining or obtaining estimated values of a and b according to the estimated channel $h_a$. To do so, the non-coaxial parameter estimation node may consider a maximum likelihood (ML) method according to the following mathematical expressions:

$$p(\hat{h}_a \mid a, b) = \frac{1}{(\pi\sigma^2)^{N^2}}\exp\left(-\frac{1}{\sigma^2}\left\|\hat{h}_a - vec(ba^T) \circ h\right\|^2\right)$$

$$\Rightarrow (\hat{a}, \hat{b}) = \arg\min\left\|\hat{h}_a - vec(ba^T) \circ h\right\|^2$$

The above mathematical expressions may be based on, or associated with, an objective function $J(a, b) = \|\hat{H}_a - ba^T \circ H\|_F^2$, such that $$J(a,b) = \|(\hat{H}_a \circ H^{\circ -1} - ba^T) \circ H\|_F^2 \leq \|(\hat{H}_a \circ H^{\circ -1} - ba^T)\|_F^2 |H|_F^2$$

This may allow the objective function to be simplified as:

$$(\hat{a}, \hat{b}) = \arg\min\|\hat{H}_a \circ H^{\circ -1} - ba^T\|_F^2 = \arg\min\|C - ba^T\|_F^2$$

where â is an estimate of element or part a of the channel variation, and $\hat{b}$ is an estimate of element or part b of the channel variation. In turn, the non-coaxial parameter estimation node may jointly estimate a and b by determining â and $\hat{b}$ according to the above mathematical formulas, and/or in any of various ways, such as through an optimization approach, machine learning, and/or signal processing.

Additionally, similar to Cases 1-3, such embodiments for Case 4 may be extended to P-loop UCA transmission and Q-loop UCA reception, where P≥1, Q≥1, and the transmitting UCA and/or the receiving UCA includes a central antenna element. By analyzing the channel expression of UCA-MIMO, the non-coaxial parameter estimation node may analyze the deviation matrix of a transceiver, and the send or feedback the deviation matrix to the transmitting node 102. In particular, the non-coaxial parameter estimation node may determine â, which may be a vector having a size N×1, and send â to the transmitting node 102.

Additionally, the embodiments in Case 4 may be extended to situations where rotational non-coaxiality exists, or both offset non-coaxiality and rotational non-coaxiality exists between the transmitting and receiving nodes 102, 104.

Case 5

In a fifth case (Case 5), the non-coaxial parameter estimation node may determine an equivalent channel expression h, according to the following mathematical formula.

$$\tilde{h}_{nl} = \sqrt{M}\frac{G\lambda}{4\pi\sqrt{d^2 + a^2 + R^2}}\exp\left(\frac{-j2\pi\sqrt{d^2 + a^2 + R^2}}{\lambda}\right)$$

$$\exp(j(\varphi_n + \alpha_r - \beta)l) \times \exp\left(\frac{j2\pi}{\lambda}\frac{dR\sin\phi\cos(\varphi_n + \alpha_r - \theta)}{\sqrt{R^2 + a^2 + d^2}}\right) \times$$

$$J_l\left(\frac{-2\pi}{\lambda}\frac{a\sqrt{R^2 + d^2\sin^2\phi - 2Rd\sin\phi\cos(\varphi_n + \alpha_r - \theta)}}{\sqrt{R^2 + a^2 + d^2}}\right)$$

In addition, in various of these embodiments, the non-coaxial parameter estimation node may determine or estimate the offset non-coaxial parameter based on the amplitude of the received signal using the Bessel function according to the following mathematical formula:

$$d\sin^2\phi - 2R\sin\phi\cos(\varphi_n + \alpha_r - \theta) = \frac{b_n - R^2}{d}$$

Also, in various embodiments, the amount of coaxial error caused by non-coaxial offset and/or rotation may be within a range of the main lobe of the Bessel function. For such embodiments, the non-coaxial parameter estimation node may select the smallest value in the range as the non-coaxial parameter estimation result. Additionally, for embodiments, where the amount of coaxial error is not within the range of the main lobe of the Bessel function, the non-coaxial parameter estimation node may select the non-coaxial coaxial parameter from certain information, such as the angle of the received signal. Use of a multi-loop UCA, at least at the transmitting side, may narrow the range of non-coaxial parameters or otherwise determine the non-coaxial parameters.

Additionally, similar to the prior cases, such embodiments for Case 5 may be extended to P-loop UCA transmission and Q-loop UCA reception, where P≥1, Q≥1, and the transmitting UCA and/or the receiving UCA includes a central antenna element. The non-coaxial parameters that may be determined include the offset azimuth angle ϕ, the offset rotation angle value θ, the rotation angle around the x-axis α, and the rotation angle around the y-axis β. The non-coaxial parameter estimation node may send or feedback the non-coaxial parameters to the transmitting node.

Case 6

A sixth case (Case 6) may include cases where the transmitting node 102 includes a central antenna element to transmit a signal to the receiving node 104, the receiving node 104 includes a Q-loop UCA to receive the signal (Q≥1), and/or cases where the transmitting node's antenna 108 includes a central antenna element and/or the receiving node's antenna 108 includes a central antenna element. For such cases, the non-coaxial parameter estimation node may determine a channel element $h_{q,n}$ of a channel expression (or channel matrix expression) according to the following mathematical formula:

$$h_{q,n} = \frac{G\lambda}{4\pi d}\exp\left(-jk\sqrt{R_q^2 + d^2}\right) \times \exp(jkR_q\cos\varphi_n(\sin\phi\cos\theta - \sin\beta\cos\phi)) \times$$
$$\exp(jkR_q\sin\varphi_n(\sin\phi\sin\theta + \sin\alpha\cos\phi + \sin\alpha\sin\beta\sin\phi\cos\theta))$$

where n and q are indices for an nth antenna element of a qth receiving UCA, where $R_q$ is the radius of the receiving UCA of the receiving node 104.

The non-coaxial parameter estimation node may determine an estimated channel by determining a plurality of channel elements $h_{q,n}$ for different q and n according to the above formula and upon transmission of one or more signals from the transmitting node to the receiving node. In various embodiments, in addition to determining the estimated channel, the non-coaxial parameter estimation node may perform non-coaxial parameter estimation by traversing sets of non-coaxial parameter values to determine the offset azimuth angle ϕ, the offset rotation angle value θ, the rotation angle around the x-axis α, and the rotation angle around the y-axis β, similar to the cases above as previously described. In other embodiments, the non-coaxial parameter estimation node may determine non-coaxial parameters by selecting them from a channel comparison table (which may be stored in a memory) that corresponds to different deviations, or by constructing a linear programming problem that solves the offset and rotational non-coaxial parameters. Other embodiments may not determine the non-coaxial parameters upon determining the estimated channel.

Further, in various embodiments, the non-coaxial parameter estimation node may define a parameter $X_R$ according to the following mathematical formula:

$X_R$=Sin ϕcos θ−Sin βcos ϕ,$\delta_R$=sin ϕ sin θ+sin αcos ϕ+sin α sin β sin ϕcos θ

For such embodiments, the non-coaxial parameter estimation node may determine the estimated channel $h_{q,n}$ according to the following mathematical formula:

$$h_{q,n} = \frac{G\lambda}{4\pi d}\exp\left(-jk\sqrt{R_q^2 + d^2}\right) \times \exp(jkR_q\cos\phi_n X_R) \times \exp(jkR_q\sin\phi_n \delta_R)$$

Upon transmission of one or more signals (e.g., pilot signals) from the transmitting node 102 to the receiving node 104, and then determining the estimated channel $h_q n$, such as according to the above formula, the non-coaxial parameter estimation node may then determine or estimate the true non-coaxial parameters, and in turn determine or estimate combined non-coaxial parameters. Alternatively, the non-coaxial parameter estimation node may determine or estimate the true and/or combined non-coaxial parameters through other channel information, such as channel amplitude and/or angle information. Additionally, the non-coaxial parameter estimation node may determine the combined non-coaxial parameters $X_R$, $\delta_R$ using structural characteristics of the channel, such as [cos $\varphi_n$ sin $\varphi_n$] and/or using channel estimation methods such as least squares and/or least mean square.

Additionally, for embodiments of the sixth case where a central antenna element is configured in an antenna array 108 of the transmitting node 102 and in an antenna array 108 of the receiving node 104, the non-coaxial parameter estimation node may estimate the non-coaxial parameters for the transmitting node 102 based on the P-loop UCA of the transmitting node 102, where P≥1, and the presence of a central antenna element of the receiving node 104 and/or the presence of a central antenna element of the transmitting node 102. Various of these embodiments may experience the problem of rank deficiency caused by the receiving node 102 including only a single receiving antenna element, the transmitting node 102 may transmit according to a time-sharing transmission of different OAM modes in order for the non-coaxial parameter estimation node to determine the parameters $X_T$=sin φ cos θ and $\delta_T$=sin φ sin θ.

Additionally, the number of OAM modes may vary, depending on the situation. More OAM modes requires more time slot resources, and the number of non-coaxial parameter estimation results increases according to increased numbers of OAM modes. Likewise, fewer OAM modes requires fewer time slot resources. However, fewer OAM modes may decrease the accuracy of the non-coaxial parameter estimation. Various implementations may seek a trade-off between resource consumption and non-coaxial parameter estimation performance.

Also, for embodiments under Case 6, including those where the receiving node 104 uses only one antenna element to receive the OAM signal from the transmitting node 102, the transmitting node 102 may transmit an OAM signal with OAM modes l=1, . . . , L separately at N times. In turn, the received signal y may be mathematically represented as y=[$y_0, y_1, \ldots, y_{N-1}$]=hF. In turn, the non-coaxial parameter estimation node may determine an estimated channel h based on the received signal y according to the following mathematical formula:

$$\hat{h}=(hF+n)F^H=h+nF^H$$

where F is the discrete Fourier transform (DFT) matrix, and $F^H$ is the inverse discrete Fourier transform (IDFT).

Further, the non-coaxial parameter estimation node may determine the combined non-coaxial parameters $X_T$, $\delta_T$ using structural characteristics of the channel, such as [cos φ sin φ] and/or using channel estimation methods such as least squares and/or least mean square.

Additionally, in the event that there is both non-coaxial offset and non-coaxial rotation between the transmitting node 102 and the receiving node 104, the non-coaxial parameter estimation node may determine the combined non-coaxial parameters $X_T$, $\delta_T$ for the transmitting node 102. The non-coaxial parameter estimation node may send or feedback the combined non-coaxial parameters $X_T$, $\delta_T$ to the transmitting node 102. In the event that there is only a non-coaxial offset, the non-coaxial parameter estimation node may determine the combined non-coaxial parameters $X_T$, $\delta_T$ for the antenna 108 of the transmitting node 102 or the combined non-coaxial parameters $X_R$, $\delta_R$ for the antenna 108 of the receiving node 104. The non-coaxial parameter estimation node may send or feedback the combined non-coaxial parameters $X_T$, $\delta_T$ or $X_R$, $\delta_R$ the transmitting node 102. In the event that there is only non-coaxial rotation, the non-coaxial parameter estimation node may determine only the combined parameters $X_R$, $\delta_R$ for the antenna 108 of the receiving node 104. For this latter situation, the non-coaxial parameter estimation node may not send or feedback any non-coaxial parameters to the transmitting node 102.

Case 7

In a seventh case (Case 7), the transmitting node 102 may include a single antenna element to transmit the signal to the receiving node 104, and the receiving node 104 may have a receiving UCA to receive the signal. A channel expression $h_n$ for an nth antenna element of the receiving UCA of the receiving node 104 may be represented or expressed according to the following mathematical formula:

$$h_n = \frac{G\lambda}{4\pi d}\exp\left(-jk\sqrt{R^2 + d^2}\right) \times$$
$$\exp(jkR\sin\phi\cos(\varphi_n - \theta)) \times \exp(-jkR\cos\varphi_n\sin\beta\cos\phi) \times$$
$$\exp(jkR\sin\varphi_n\sin\alpha\cos\phi) \times \exp(jkR\sin\varphi_n\sin\alpha\sin\beta\sin\phi\cos\theta)$$

For such embodiments, the channel h (where $h=[h_1\ h_2\ \ldots\ h_N]$) may be represented or expressed according to the following mathematical function:

$$h = A(\alpha,\beta,\varphi,\theta)h_0$$

The non-coaxial parameter estimation node may determine an optimization target $h_1$ that minimizes the difference between the channel h and an equal element vector according to the following mathematical formula:

$$h_1 = G(\tilde{\alpha},\tilde{\beta},\tilde{\phi},\tilde{\theta})h$$

and may determine or select the optimization target $h_1$ to be one from among a plurality of candidate optimization targets that is closest to the equivalent matrix representing the coaxial channel (after DFT and IDFT are performed). In particular embodiments, the non-coaxial parameter estimation node may determine the optimization target $h_1$ to satisfy the following mathematical criteria:

$$\min_{\tilde{\alpha},\tilde{\beta},\tilde{\phi},\tilde{\theta},c} f(\tilde{\alpha},\tilde{\beta},\tilde{\phi},\tilde{\theta},c) = |h_1 - c_1|^2$$
$$\text{s.t.}\quad c_1 = c \cdot 1$$
$$h_1 = G(\tilde{\alpha},\tilde{\beta},\tilde{\phi},\tilde{\theta})h$$

Although the problem is not convex, the non-coaxial parameter estimation node may determine or obtain all local maximums through any of various methods (e.g., gradient descent or geometric programming, as non-limiting examples), and may select a global maximum from the local maximums. For at least some embodiments, the non-coaxial parameter estimation mode may use the following algorithm to determine the optimization target $h_1$.

Algorithm:
Initialization:

$$\alpha_0 = 0,\ c_0 = \frac{\sum_n h_{1,n}}{N} - 1,\ \text{step } b = 0.5$$

(Optimize $\alpha$):
  Use gradient descent to search $\alpha_1$ that meets $f(\alpha_1,c_0) < f(\alpha_1,c_0)$
(optimize c)

$$c^* = \frac{1}{N}G(\alpha_1)h$$

Judgment
  $\text{norm}(h_0 - G(\alpha)h) < T_h$, then stop, otherwise return to (Optimize $\alpha$)

Non-convex optimization algorithms other than the one above may be used to determine the optimization target $h_1$ in various other embodiments.

In other embodiments, the non-coaxial parameter estimation node may solve the optimization problem by maximizing posterior probability:

$$p(\alpha,\beta,\phi,\theta|h_1) = p(G(\alpha,\beta,\phi,\theta)h|h_1), h = G(\alpha,\beta,\phi,\theta)h + n$$

The optimization problem may be transformed into:

$$(\hat{\alpha},\hat{\beta},\hat{\phi},\hat{\theta}) = \arg\max p(G(\alpha,\beta,\phi,\theta)h|h_1) = \arg\max \|G(\alpha,\beta,\phi,\theta)h - h_1\|_2^2$$

Additionally, similar to the prior cases, such embodiments for Case 7 may be extended to P-loop UCA transmission and Q-loop UCA reception, where $P \geq 1$, $Q \geq 1$, and the transmitting UCA and/or the receiving UCA includes a central antenna element. By analyzing the channel expression of UCA-MIMO, the optimization problem is solved. Additionally, the non-coaxial parameters that may be determined include the offset azimuth angle $\phi$, the offset rotation angle value $\theta$, the rotation angle around the x-axis $\alpha$, and the rotation angle around the y-axis $\beta$. In various embodiments, the non-coaxial parameter that are determined may include only the offset azimuth angle $\phi$ and the offset rotation angle value $\theta$. The non-coaxial parameter estimation node may send or feedback the non-coaxial parameters to the transmitting node.

Case 8

In an eighth case (Case 8), due to $2\pi$ phase ambiguity (including 2π1 phase ambiguity experienced in situations as describe above in Case 6), the combined non-coaxial parameter results that the non-coaxial parameter estimation node determines may have errors. To reduce or minimize the likelihood of errors, or otherwise compensate for the errors, the non-coaxial parameter estimation node may not estimate the true non-coaxial parameters or the combined non-coaxial parameters. Instead, the non-coaxial parameter estimation node may determine or obtain channel compensation parameters directly from the received signal.

For embodiments where the transmitting node 102 uses a central antenna element to transmit signals and the receiving node 104 uses a Q-loop UCA to receive the signals (where $Q \geq 1$), and for embodiments where the transmitting node 102 includes a central antenna element and/or the receiving node 104 includes a central antenna element, a compensation node (which may be the transmitting node 102, the receiving node 104, the non-coaxial parameter estimation node, another node in the wireless system 100, or any of various combinations thereof) may determine one or more compensation parameters through the received signal as received by the receiving node 104. In particular embodiments, the compensation node may determine a compensation parameter $K_{R,q,n}$ for an nth receiving antenna element n according to the following mathematical formula:

$$K_{R,q,n} = \exp(jkR_q \cos\phi_n(\sin\phi\cos\theta - \sin\beta\cos\phi)) \times \exp(jkR_q \sin\phi_n(\sin\phi\sin\theta + \sin\alpha\cos\phi + \sin\alpha\sin\beta\sin\phi\cos\theta))$$

For embodiments where both the transmitting node 102 uses a central antenna element and the receiving node 104 uses a central antenna element, and the P-loop UCA transmission (P≥1) can be adopted, the compensation node may determine or obtain the compensation parameters for the receiving node based on received signal. In particular embodiments, the compensation node may determine a compensation parameter $K_{T,p,m}$ for an mth transmitting antenna according to the following mathematical formula:

$$K_{T,p,m} = \exp(jka_p \cos\phi_m(\sin\phi\cos\theta)) \times \exp(jka_p \sin\phi_m(\sin\phi\sin\theta))$$

After the compensation node determines the compensation parameter $K_{T,p,m}$ for the transmitting node 102, the compensation node may send or feedback the compensation parameter $K_{T,p,m}$ to the transmitting node for embodiments where the compensation node is different than the transmitting node 102. Additionally, where the compensation node is the receiving node 104, the receiving node 104 may directly use the compensation parameter $K_{R,q,n}$ for channel compensation (e.g., beam forming and/or selecting a beam) on the receiving side.

Case 9

In a ninth case (Case 9), in order to use the circulant matrix characteristic to perform a DFT transformation in order to form a diagonal matrix that is orthogonal, the non-coaxial parameter estimation node may determine the equivalent channel to be a circulant matrix through the design of a precoding and receiving matrix.

For situations where offset non-coaxiality exists between the transmitting node 102 and the receiving node 104, the non-coaxial parameter estimation node may determine the offset non-coaxial parameters, including the offset azimuth angle $\phi$ and the offset rotation angle $\theta$. When it does so, the non-coaxial parameter estimation node may define a diagonal matrix for a pth transmitting UCA p and a qth receiving UCA q according to the following mathematical formulas:

$$P^T_{m,m} = \exp\left(\frac{j2\pi}{\lambda} a_p \sin\phi\cos(\varphi_m - \theta)\right)$$

$$P^R_{n,n} = \exp\left(-\frac{j2\pi}{\lambda} R_q \sin\phi\cos(\varphi_n - \theta)\right)$$

where $P^T_{m,m}$ is a (m, m)-th element of the transmitting-side beam forming matrix $P^T$ for the transmitting node 102, and $P^R_{n,n}$ is a (n, n)-th element of the receiving-side beam forming matrix $P^R$ for the receiving node 104.

In turn, the non-coaxial parameter estimation node may determine or realize the channel compensation for offset non-coaxiality according to the following mathematical formula:

$$H^E = P^R H P^T$$

where $H^E$ represents the channel after compensation (beam forming), $P^R$ is receiving-side beam forming matrix, H is the non-coaxial channel, and $P^T$ is the transmitting-side beam forming matrix.

Additionally, for situations where rotational non-coaxiality exists between the transmitting node 102 and the receiving node 104, the non-coaxial parameter estimation node may determine or obtain the rotation angle around the x-axis $\alpha$ and the rotation angle around the y-axis $\beta$. In doing so, the non-coaxial parameter estimation node may define a transmitting-side beam forming matrix A according to the following mathematical formulas:

$$A = \text{diag}(a), \text{ where}$$

$$a_m = \exp(jkR_q(\cos\phi_m \sin\beta - \sin\phi_m \sin\alpha))$$

where $a = [a_1\ a_2\ \ldots\ a_N]$ and am is an mth element of vector a corresponding to an mth antenna element of the transmitting node 102.

In turn, the non-coaxial parameter estimation node may determine the processed channel $H^E$ based on the beam forming matrix A, such as according to the mathematical formula $H^E = AH$. [HE=HA] In this way, the wireless system 100 may employ channel compensation when the rotation deviation is obtained.

Additionally, for situations where both offset non-coaxiality and rotational non-coaxiality exists between the transmitting node 102 and the receiving node 104, after the non-coaxial parameter estimation node determines offset high and low angle non-coaxial parameter, the offset rotation angle, the rotation angle around the x-axis $\alpha$, and the rotation angle around the y-axis $\beta$, the non-coaxial parameter estimation node may use a pre-processing matrix for the transmitting node 102 and the receiving node 104 in order to convert the channel into a circulant matrix. For some embodiments, the non-coaxial parameter estimation node may determine the transmitting-side beam forming matrix A and the receiving-side beam forming matrix B as:

$$A = \text{diag}(a)$$

$$B = \text{diag}(b)$$

such that the following mathematical formulas are satisfied:

$$a_n = \exp(jkR(-\sin\phi\cos(\varphi_n - \theta) + \cos\varphi_n \sin\beta\cos\phi - \sin\varphi_n \sin\alpha\cos\phi - \sin\varphi_n \sin\alpha\sin\beta\sin\phi\cos\theta))$$

$$b_m = \exp(jka \sin\phi\cos(\varphi_m - \theta))$$

Upon determining the beam forming matrices A and B, the non-coaxial parameter estimation node may determine the processed channel $H^E$ according to $H^E = AHB$. Using these formulas, the wireless system 100 may implement a channel compensation scheme that obtains true non-coaxial parameters.

Case 10

In a tenth case (Case 10), in order to determine the combined non-coaxial parameters, the compensation node may compensate the channel based on the processed channel $H^E$, such as according to $H^E = BHA$. In doing so, the compensation node may determine the channel to be sufficiently close to (e.g., within a predetermined proximity or range of) the circulant matrix in order to maintain orthogonality between the OAM modes. The compensation node may employ the following channel compensation scheme:

For a pth transmitting UCA of the transmitting node 102, the compensation node may determine the precoding matrix according to the following mathematical formula:

$$[A]_{p,m} = \exp(jka_p(\cos\varphi_{p,m} X_T + \sin\varphi_{p,m} \delta_T))$$

In addition, for a qth receiving UCA of the receiving node 104, the compensation node may determine the precoding matrix at the receiving side (also called a pre-receiving matrix) according to the following mathematical formula:

$$[B]_{q,n} = \exp(jkR_q(\cos\varphi_{q,n} X + \sin\varphi_{q,n} \delta))$$

Case 11

In an eleventh case (Case 11), the non-coaxial parameter estimation node may determine an originating or transmitting error matrix A and a receiving error matrix B. In particular embodiments, the transmitting error matrix A may have a diagonal structure. Upon doing so, the non-coaxial parameter estimation node may send or feed back the transmitting error matrix A to the transmitting node 102 for channel compensation.

Additionally, for P-loop UCA transmission and Q-loop UCA reception (where P≥1, Q≥1), and for situations where the transmitting node 102 includes a central antenna element, and/or the receiving node 104 includes a central antenna element, the compensation node may determine a compensation parameter $\hat{K}_{R,q,n}$ for an nth antenna element of a qth loop or ring of a receiving UCA as a block diagonal matrix according to the following mathematical formula:

$$[B]_{q,n} = k_{R,q,n} = \exp(jkR_q \cos \varphi_n (\sin \phi \cos \theta - \sin \beta \cos \phi)) \times \exp(jkR_q \sin \varphi_n (\sin \phi \sin \theta + \sin \alpha \cos \phi + \sin \alpha \sin \beta \sin \phi \cos \theta))$$

Accordingly, the compensation node may compensate the channel according to $H^E = BHA$ such that the channel is close to (e.g., within a predetermined range of) the circulant matrix and orthogonality between OAM modes is maintained.

Case 12

In a twelfth case (Case 12), the receiving matrix design can be done directly at the level of the overall channel. The non-coaxial parameter estimation node may use SVD to determine or express the channel H in the form of $H = U\Sigma V^H$, where the non-coaxial parameter estimation node sends or feeds back V to the transmitting node. For such embodiments, the transmitting node 102 may set the precoding matrix to V, and the receiving node may set the processing matrix to $U^H$, and determine the diagonal decomposition of the channel according to $U^H$. The non-coaxial parameter estimation node may transform the non-coaxial channel into a circulant matrix, making full use of the orthogonality of the corresponding channels of the circulant matrix.

Additionally, in various embodiments, the non-coaxial parameter estimation node may determine the original channel matrix H according to $H = S_H V_H U_H^H$ and the equivalent circulant matrix $H^E$ according to HE $S_{H^E} V_{H^E} U_{H^E}$. Also, the non-coaxial parameter estimation node may determine the precoding matrix $p^T$ and the receiving matrix $p^R$ according to the following mathematical formulas:

$$p^T = U_H U_{H^E}^H$$

$$p^R = S_{H^E} S_H^H$$

The transmitted signal (e.g., the transmitted data signal) may be obtained with low complexity through algorithms such as ML, LS, or MMSE, as non-limiting examples. Additionally, MIMO processing methods may be used to perform LS/MMSE/SIC equalization after obtaining the estimated channel to obtain the received signal data.

The subject matter of the present description may further include the following aspects:

1. A method for wireless communication, the method comprising:
   receiving, by a receiving node, an orbital angular momentum (OAM) signal from a transmitting node;
   determining, by non-coaxial parameter estimation node, one or more non-coaxial parameters according to the OAM signal; and selecting, by the receiving node, at least one beam from a plurality of beams for communication with the transmitting node according to the one or more non-coaxial parameters.

2. The method of aspect 1, wherein receiving the OAM signal comprises receiving the OAM signal with a uniform circular array (UCA) of the receiving node.

3. The method of aspect 2, wherein receiving the OAM signal further comprises receiving the OAM signal with a central antenna element of the UCA.

4. The method of aspect 1, wherein the one or more non-coaxial parameters comprises at least one offset non-coaxial parameter.

5. The method of aspect 4, wherein the at least one offset non-coaxial parameter comprises at least one of an offset azimuth angle or an offset rotation angle.

6. The method of aspect 4, wherein the at least one offset non-coaxial parameter further comprises at least one of an amount of movement in an x-direction relative to the receiving node or an amount of movement in a y-direction relative to the receiving node.

7. The method of aspect 1, wherein the one or more non-coaxial parameters comprises at least one rotational non-coaxial parameter, the at least one rotational non-coaxial parameter comprising at least one of a rotation angle around an x-axis relative to the receiving node or a rotation angle around a y-axis relative to the receiving node.

8. The method of aspect 1, further comprising:
   estimating, by the non-coaxial parameter estimation node, a channel as a cyclic matrix or a as coaxial line-of-sight (LOS) channel.

9. The method of aspect 1, wherein determining one or more non-coaxial parameters according to the OAM signal comprises:
   traversing, by the non-coaxial parameter estimation node, a set of grid points corresponding to a non-coaxial parameter of the one or more non-coaxial parameters; and selecting, by the non-coaxial parameter estimation node, a value from the set of grid points for the non-coaxial parameter.

10. The method of aspect 1, further comprising:
    comparing, by the non-coaxial parameter estimation node, a plurality of modulus values of channel elements corresponding to the OAM signal,
    wherein determining the one or more non-coaxial parameters according to the OAM signal comprises: in response to the comparing, determining, by the non-coaxial parameter estimation node, a set of non-coaxial parameters that renders the plurality of modulus values closest to each other.

11. The method of aspect 1, wherein the one or more non-coaxial parameters comprises a first type of non-coaxial parameters, and wherein determining the one or more non-coaxial parameters comprises determining, by the non-coaxial parameter estimation node, a second type of non-coaxial parameter that comprises a combination of two or more of the first type of non-coaxial parameters.

12. The method of aspect 1, wherein the one or more non-coaxial parameters comprises one or more deviation parameters corresponding to a deviation matrix,
    wherein determining the one or more non-coaxial parameters comprises
    determining the deviation matrix for the transmitting node or for the receiving node in response to determination of only offset non-coaxiality between the transmitting node and the receiving node;

determining the deviation matrix only for the receiving node in response to determination of only rotational non-coaxiality between the transmitting node and the receiving node;

determining the deviation matrix and a second deviation matrix in response to determination of both offset non-coaxiality and rotational non-coaxiality between the transmitting node and the receiving node, wherein the deviation matrix is for one of the transmitting node and the receiving node and the second deviation matrix is for the other of the transmitting node and the receiving node.

13. The method of aspect 1, wherein determining the one or more non-coaxial parameters comprises determining the one or more non-coaxial parameters according to a Bessel function distribution.

14. The method of aspect 1, further comprising, transmitting, by the non-coaxial estimation node, the one or more non-coaxial parameters to the transmitting node.

15. The method of aspect 1, wherein the one or more non-coaxial parameters comprises one or more channel deviation parameters corresponding to a first deviation matrix for the transmitting node and a second deviation matrix for the receiving node, wherein determining the one or more non-coaxial parameters comprises estimating the one or more channel deviation parameters according to the following mathematical formula: $H=BH^CA$ where H is an estimated channel, A is the first deviation matrix on the transmitting side, B is the second deviation matrix on the receiving side, and C is the real channel without compensation.

16. The method of aspect 1, wherein determining the one or more non-coaxial parameters according to the OAM signal comprises:

determining a channel expression $h_{m,n}$ for an mth antenna element of the transmitting node and an nth antenna element of the receiving node based on a radius of a transmitting uniform central array of the transmitting node, a radius of a receiving uniform central array of the receiving node, a transmission distance between the transmitting node and the receiving node, an angular difference between an antenna element of the transmitting uniform central array and an x-axis, and an angular difference between an antenna element of the receiving UCA and the x-axis.

17. The method of aspect 16, wherein the one or more non-coaxial parameters comprises an offset azimuth angle and an offset rotational angle, wherein determining the one or more non-coaxial parameters according to the OAM signal further comprises:

constructing a diagonal matrix that satisfies the following mathematical formula:

$$[G_M]_{i,i} = \exp\left(\frac{j2\pi\sin\gamma}{\lambda} a\cos(\phi_i - \vartheta)\right),$$

$$[G_N]_{j,j} = \exp\left(\frac{-j2\pi\sin\gamma}{\lambda} R\cos(\phi_j - \vartheta)\right)$$

wherein a processed channel $G=G_N H G_M$, where GM is the beamforming matrix on the transmitting side, $G_N$ is the beamforming matrix on the receiving side; i and j are indices for an ith antenna element of the transmitting node 102 and a jth antenna element of the receiving node 104; $\vartheta$ is an estimation of the offset rotation angle $\theta$, and $\gamma$ is an estimation of the offset azimuth angle $\phi$, and where G is a circulant matrix.

18. The method of aspect 1, wherein the non-coaxial parameters comprises a rotation angle around an x-axis and a rotation angle around a y-axis, wherein determining the one or more non-coaxial parameters comprising:

traversing, by the non-coaxial parameter estimation node, a first set of values corresponding to the rotation angle around the x-axis and a second set of values corresponding to the rotation angle around the y-axis;

selecting a first value from the first set for the rotation angle around the x-axis and a second value from the second set for the rotation angle around the y-axis based on the first value and the second value corresponding to a channel expression $h_{m,n}$ that is closest to a circulant matrix, wherein m corresponds to an mth antenna element of the transmitting node and n corresponds to an nth antenna element of the receiving node.

19. The method of aspect 1, wherein determining the one or more non-coaxial parameters comprises: determining parts $a_m$ and $b_n$ of a channel variation for channel elements n and m.

20. The method of claim 1, wherein determining the one or more non-coaxial parameters comprises: determining an optimization target that is a closest target from a plurality of candidate targets that is closest to an equivalent matrix representing a coaxial channel between the transmitting node and the receiving node.

21. The method of aspect 1, further comprising: determining, by a compensation node, a compensation parameter for an nth antenna element of the receiving node based on the one or more coaxial parameters, wherein selecting the at least one beam from the plurality of beams is according to the compensation parameter.

22. The method of aspect 1, further comprising: determining at least one of a precoding matrix for pth transmitting UCA or a precoding matrix for a qth receiving UCA based on the one or more non-coaxial parameters.

23. The method of aspect 1, further comprising: further comprising:

determining, by a compensation node, a channel within a certain proximity a circulant matrix, the certain proximity maintaining orthogonality between a plurality of OAM modes of the OAM signal.

24. The method of aspect 1, further comprising determining, by the non-coaxial parameter estimation node, a receiving-side beam forming matrix based on the one or more non-coaxial parameters, wherein selecting the at least one beam form the plurality of beams is based on the receiving side beam forming matrix.

25. The method of aspect 1, further comprising: determining, by the non-coaxial parameter estimation node, a channel matrix H according to single value decomposition, and a first precoding matrix for the transmitting node and a second precoding matrix for the receiving node; and sending the precoding matrix to the transmitting node.

26. A method for wireless communication, the method comprising:

transmitting, by a transmitting node, an orbital angular momentum (OAM) signal to a receiving node;

receiving, by the transmitting node, one or more non-coaxial parameters determined according to receipt of the OAM signal by the receiving node; and
selecting, by the transmitting node, at least one beam from a plurality of beams for communication with the receiving node according to the one or more non-coaxial parameters.

27. The method of aspect 26, further comprising the method recited in any of aspects 1 to 25.

28. A system comprising at least one intelligent reflecting device, each of the at least one intelligent reflecting device comprising a controller and a surface that comprises a plurality of network elements, the system configured to implement a method recited in any of claims 1 to 27.

29. A computer program product comprising a computer-readable program medium code stored thereupon, the code, when executed by a processor, causing the processor to implement a method recited in any of claims 1 to 27 with at least one intelligent reflecting device.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The invention claimed is:

1. A method for wireless communication, the method comprising:
receiving, by a receiving node, an orbital angular momentum (OAM) signal from a transmitting node;
determining, by the receiving node, one or more non-coaxial parameters according to the OAM signal by traversing a set of grid points corresponding to a non-coaxial parameter of the one or more non-coaxial parameters and selecting a value from the set of grid points for the non-coaxial parameter; and
selecting, by the receiving node, at least one beam from a plurality of beams for communication with the transmitting node according to the one or more non-coaxial parameters.

2. The method of claim 1, wherein receiving the OAM signal comprises receiving the OAM signal with a uniform circular array (UCA) of the receiving node.

3. The method of claim 1, wherein the one or more non-coaxial parameters comprises at least one of:
at least one offset non-coaxial parameter; or
at least one rotational non-coaxial parameter, the at least one rotational non-coaxial parameter comprising at least one of a rotation angle around an x-axis relative to the receiving node or a rotation angle around a y-axis relative to the receiving node.

4. The method of claim 1, further comprising:
estimating, by the receiving node, a channel as a cyclic matrix or as a coaxial line-of-sight (LOS) channel.

5. The method of claim 1, further comprising:
comparing, by the receiving node, a plurality of modulus values of channel elements corresponding to the OAM signal,
wherein determining the one or more non-coaxial parameters according to the OAM signal comprises: in response to the comparing, determining, by the receiving node, a set of non-coaxial parameters that renders the plurality of modulus values closest to each other.

6. The method of claim 1, wherein the one or more non-coaxial parameters comprises a first type of non-coaxial parameters, and wherein determining the one or more non-coaxial parameters comprises determining, by the receiving node, a second type of non-coaxial parameter that comprises a combination of two or more of the first type of non-coaxial parameters.

7. The method of claim 1, wherein the one or more non-coaxial parameters comprises one or more deviation parameters corresponding to a deviation matrix, wherein determining the one or more non-coaxial parameters comprises:
   determining the deviation matrix for the transmitting node or for the receiving node in response to determination of only offset non-coaxiality between the transmitting node and the receiving node;
   determining the deviation matrix only for the receiving node in response to determination of only rotational non-coaxiality between the transmitting node and the receiving node;
   determining the deviation matrix and a second deviation matrix in response to determination of both offset non-coaxiality and rotational non-coaxiality between the transmitting node and the receiving node, wherein the deviation matrix is for one of the transmitting node and the receiving node and the second deviation matrix is for the other of the transmitting node and the receiving node.

8. The method of claim 1, wherein the one or more non-coaxial parameters comprises one or more channel deviation parameters corresponding to a first deviation matrix for the transmitting node and a second deviation matrix for the receiving node, wherein determining the one or more non-coaxial parameters comprises estimating the one or more channel deviation parameters according to the following mathematical formula:

$$H = B H^C A$$

where H is an estimated channel, A is the first deviation matrix for the transmitting-side node, B is the second deviation matrix for the receiving node, and C is a real channel without compensation.

9. The method of claim 1, wherein determining the one or more non-coaxial parameters according to the OAM signal comprises:
   determining a channel expression $h_{m,n}$ for an mth antenna element of the transmitting node and an nth antenna element of the receiving node based on a radius of a transmitting uniform central array of the transmitting node, a radius of a receiving uniform central array of the receiving node, a transmission distance between the transmitting node and the receiving node, an angular difference between an antenna element of the transmitting uniform central array and an x-axis, and an angular difference between an antenna element of a UCA of the receiving node and the x-axis.

10. The method of claim 1, wherein the non-coaxial parameters comprises a rotation angle around an x-axis and a rotation angle around a y-axis, wherein determining the one or more non-coaxial parameters comprising:
   traversing, by the receiving node, a first set of values corresponding to the rotation angle around the x-axis and a second set of values corresponding to the rotation angle around the y-axis;
   selecting a first value from the first set for the rotation angle around the x-axis and a second value from the second set for the rotation angle around the y-axis based on the first value and the second value corresponding to a channel expression $h_{m,n}$ that is closest to a circulant matrix, wherein m corresponds to an mth antenna element of the transmitting node and n corresponds to an nth antenna element of the receiving node.

11. The method of claim 1, wherein determining the one or more non-coaxial parameters comprises: determining parts $a_m$ and $b_n$ of a channel variation for channel elements n and m.

12. The method of claim 1, wherein determining the one or more non-coaxial parameters comprises: determining an optimization target that is a closest target from a plurality of candidate targets that is closest to an equivalent matrix representing a coaxial channel between the transmitting node and the receiving node.

13. The method of claim 1, further comprising: determining, by the receiving node, a compensation parameter for an nth antenna element of the receiving node based on the one or more coaxial parameters, wherein selecting the at least one beam from the plurality of beams is according to the compensation parameter.

14. The method of claim 1, further comprising: determining at least one of a precoding matrix for a pth transmitting UCA or a precoding matrix for a qth receiving UCA based on the one or more non-coaxial parameters.

15. The method of claim 1, further comprising: further comprising:
   determining, by the receiving node, a channel within a certain proximity a circulant matrix, the certain proximity maintaining orthogonality between a plurality of OAM modes of the OAM signal.

16. The method of claim 1, further comprising determining, by the receiving node, a receiving-side beam forming matrix based on the one or more non-coaxial parameters, wherein selecting the at least one beam form the plurality of beams is based on the receiving-side beam forming matrix.

17. The method of claim 1, further comprising: determining, by the receiving node, a channel matrix H according to single value decomposition, and a first precoding matrix for the transmitting node and a second precoding matrix for the receiving node; and sending the precoding matrix to the transmitting node.

18. A method for wireless communication, the method comprising:
   transmitting, by a transmitting node, an orbital angular momentum (OAM) signal to a receiving node;
   receiving, by the transmitting node, one or more non-coaxial parameters determined according to receipt of the OAM signal by the receiving node, wherein the one or more non-coaxial parameters are determined by traversing a set of grid points corresponding to a non-coaxial parameter of the one or more non-coaxial parameters and selecting a value from the set of grid points for the non-coaxial parameter; and
   selecting, by the transmitting node, at least one beam from a plurality of beams for communication with the receiving node according to the one or more non-coaxial parameters.

19. A system comprising:
   a receiving node configured to:
      receive an orbital angular momentum (OAM) signal from a transmitting node; and select at least one beam from a plurality of beams for communication with the transmitting node according to one or more non-coaxial parameters corresponding to the OAM signal, wherein the one or more non-coaxial parameters are determined by traversing a set of grid points corresponding to a non-coaxial parameter of the one or more non-coaxial parameters and selecting a value from the set of grid points for the non-coaxial parameter.

* * * * *

UNITED STATES PATENT AND TRADEMARK OFFICE
CERTIFICATE OF CORRECTION

PATENT NO. : 12,289,146 B2  
APPLICATION NO. : 18/204187  
DATED : April 29, 2025  
INVENTOR(S) : Jian Mengnan et al.

Page 1 of 1

It is certified that error appears in the above-identified patent and that said Letters Patent is hereby corrected as shown below:

In the Claims

Column 33, Claim 8, Line 34, delete "His" and replace with --H is--.

Column 33, Claim 8, Line 35, delete "-side".

Signed and Sealed this  
Twenty-fourth Day of June, 2025

Coke Morgan Stewart  
*Acting Director of the United States Patent and Trademark Office*